US007595019B2

(12) United States Patent
Cutler et al.

(10) Patent No.: US 7,595,019 B2
(45) Date of Patent: Sep. 29, 2009

(54) METHOD OF MAKING AN ION TRANSPORT MEMBRANE OXYGEN SEPARATION DEVICE

(75) Inventors: Raymond Ashton Cutler, Bountiful, UT (US); Kent Neal Hutchings, Tooele, UT (US); Merrill Anderson Wilson, West Jordan, UT (US); Ronald Almy Hollis, Pleasant Grove, UT (US); Dale M. Taylor, Salt Lake City, UT (US)

(73) Assignee: Air Products and Chemicals, Inc., Allentown, PA (US)

( * ) Notice: Subject to any disclaimer, the term of this patent is extended or adjusted under 35 U.S.C. 154(b) by 881 days.

(21) Appl. No.: 11/070,720

(22) Filed: Mar. 1, 2005

(65) Prior Publication Data

US 2006/0197264 A1    Sep. 7, 2006

(51) Int. Cl.
*B28B 5/00*    (2006.01)
(52) U.S. Cl. .................. 264/605; 264/642; 264/650
(58) Field of Classification Search .......... 264/605, 264/642, 650
See application file for complete search history.

(56) References Cited

U.S. PATENT DOCUMENTS

| 5,240,480 | A | 8/1993 | Thorogood et al. |
| 5,543,239 | A | 8/1996 | Virkar et al. |
| 5,922,486 | A | 7/1999 | Chiao |
| 5,935,727 | A | * | 8/1999 | Chiao ................. 429/32 |
| 6,042,703 | A | 3/2000 | Adler et al. |
| 6,117,288 | A | 9/2000 | Adler et al. |
| 6,368,383 | B1 | 4/2002 | Virkar et al. |
| 6,514,314 | B2 | 2/2003 | Sirman et al. |
| 6,682,842 | B1 | 1/2004 | Visco et al. |

(Continued)

FOREIGN PATENT DOCUMENTS

EP    0592809    4/1994

(Continued)

OTHER PUBLICATIONS

Jan Van Herle, et al., "Sintering Behaviour and Ionic Conductivity of Yttria-Doped Ceria", Journal of the European Ceramic Society, 16, (1996), pp. 961-973.

(Continued)

*Primary Examiner*—Carlos Lopez
*Assistant Examiner*—Russell J Kemmerle, III
(74) *Attorney, Agent, or Firm*—Keith D. Gourley; Jiyun Xu

(57) ABSTRACT

Method of making an electrochemical device for the recovery of oxygen from an oxygen-containing feed gas comprising (a) preparing a green electrochemical device by assembling a green electrolyte layer, a green anode layer in contact with the green electrolyte layer, a green cathode layer in contact with the green electrolyte layer, a green anode-side gas collection interconnect layer in contact with the green anode layer, and a green cathode-side feed gas distribution interconnect layer in contact with the green cathode layer; and (b) sintering-the green electrochemical device by heating to yield a sintered electrochemical device comprising a plurality of sintered layers including a sintered anode-side gas collection interconnect layer in contact with the anode layer and adapted to collect oxygen permeate gas, wherein each sintered layer is bonded to an adjacent sintered layer during sintering.

25 Claims, 5 Drawing Sheets

U.S. PATENT DOCUMENTS

| | | | |
|---|---|---|---|
| 6,772,501 | B2 | 8/2004 | Barker et al. |
| 6,811,914 | B2 | 11/2004 | Meixner |
| 2002/0081762 | A1 | 6/2002 | Jacobson et al. |
| 2003/0015431 | A1* | 1/2003 | Barker et al. ................ 205/170 |
| 2003/0022048 | A1* | 1/2003 | Meixner ....................... 429/32 |
| 2004/0021240 | A1 | 2/2004 | Chen et al. |
| 2004/0231143 | A1* | 11/2004 | Visco et al. ................ 29/623.5 |

FOREIGN PATENT DOCUMENTS

| | | |
|---|---|---|
| EP | 0663231 | 7/1995 |
| EP | 0732138 | 9/1996 |
| JP | 09-235102 A | 9/1997 |
| JP | 09-235121 A | 9/1997 |
| JP | 10-180031 A | 7/1998 |
| JP | 2000-086204 A | 3/2000 |
| JP | 2005-503246 A | 2/2005 |
| WO | 95/32050 A1 | 11/1995 |
| WO | 02/058829 A1 | 8/2002 |

OTHER PUBLICATIONS

Stuart B. Adler, "Chemical Expansivity of Electrochemical Ceramics", J. Am. Ceram. Soc., 84, (9), (2001), pp. 2117-2119.

D. K. Shetty, et al., "A Biaxial-Flexure Test for Evaluating Ceramic Strengths", Journal of the American Ceramic Society, vol. 66, No. 1, Jan. 1983, pp. 36-42.

V. Dusastre, et al., "Optimisation of Composite Cathodes for Intermediate Temperature SOFC Applications", Solid State Ionics, 126 (1999), Elsevier, pp. 163-174.

Hideaki Inaba, et al., "Ceria-Based Solid Electrolytes", Solid State Ionics, 83 (1996), Elsevier, pp. 1-16.

Duncan P. Fagg, et al., "P-Type Electronic Transport in $Ce_{0.8}Gd_{0.2}O_2$-$\delta$: The Effect of Transition Metal Oxide Sintering Aids", Journal of Electroceramics, 9, 2002, pp. 199-207.

C. M. Kleinlogel, et al., "Mixed Electronic-Ionic Conductivity of Cobalt Doped Cerium Gadolinium Oxide", Journal of Electroceramics 5:3, 2000, pp. 231-243.

Tianshu Zhang, et al., Sintering and Grain Growth of CoO-doped $CeO_2$ Ceramics, Journal of the European Ceramic Society, 22 (2002), pp. 27-34.

* cited by examiner

METHOD OF MAKING AN ION TRANSPORT MEMBRANE OXYGEN SEPARATION DEVICE

STATEMENT REGARDING FEDERALLY SPONSORED RESEARCH OR DEVELOPMENT

This invention was made with government support under Contract No. F1624-00-C-6000 between Air Products and Chemicals, Inc. and the U.S. Department of Defense. The Government may have certain rights to this invention.

BACKGROUND OF THE INVENTION

Electrochemical gas separation devices based on oxygen ion-conducting solid electrolytes have practical applications in the production of high-purity oxygen from air and in the removal of residual oxygen from inert gases such as argon and nitrogen. These devices typically comprise multiple electrochemical cells, each of which is fabricated with multiple layers or components including an electrolyte layer, anode and cathode layers in contact with the electrolyte layer, and interconnect layers in contact with the anode and cathode. The multiple-cell devices may be fabricated into modules designed for the introduction of feed gas into the cells and the withdrawal of permeate and non-permeate gas from the cells.

In these applications, the separation device may be operated with a difference in gas pressure and/or gas composition between the feed (cathode) sides and the product or permeate (anode) sides of the electrolyte layers. The strength of the components in the separation device and the stability of the required gas-tight seals between the layers must be sufficient to sustain practical pressure and/or composition differentials over the economic operating lifetime of the device.

Separation devices based on oxygen ion-conducting solid electrolytes can be constructed in tubular, flat plate, or honeycomb configurations. The flat plate configuration, in which a plurality of planar electrolyte cells are stacked to operate in electrical series, is favored in many applications for ease of assembly, cost effectiveness, and compact dimensions. Any configuration, however, must be designed with appropriate component strength and seal integrity to operate at a pressure differential between the feed and product gas streams while maintaining purity requirements of the product gas streams. Higher efficiency may-be obtained by minimizing resistances in the cell including ohmic (electrolyte) and non-ohmic (electrode) resistances. Electrode resistance typically is a function of the choice of electrode material, the surface area of the electrode material, and the method of contact or bonding between the electrode and electrolyte layers. Low electrode resistance may be achieved with mixed conductor electrodes, high electrode surface area, and high open porosity in order to achieve low gas phase polarization and strong bonding with the electrolyte. Low electrolyte resistance is dependent on high ionic conduction and a short path length. For this reason, thin electrolytes are desired. Lower resistance leads to lower specific power, which in turns lowers the joule heating and associated thermal stresses on the device.

The design and fabrication methods for these electrochemical devices should provide operating systems with low resistance, thin electrolytes with high mechanical strength, and robust gas-tight seals to maintain gas pressure differentials between the anode and cathode sides of the cells and to ensure the required purity of the product gas streams. In order to meet these requirements, improved methods for the design and fabrication of these devices are needed in the field of electrochemical gas separation. The embodiments of the present invention meet these needs by providing improved design and fabrication methods as described below and defined by the claims that follow.

BRIEF SUMMARY OF THE INVENTION

An embodiment of the invention relates to a method of making an electrochemical device for the recovery of oxygen from an oxygen-containing feed gas comprising (a) preparing a green electrochemical device by assembling a green electrolyte layer, a green anode layer in contact with the green electrolyte layer, a green cathode layer in contact with the green electrolyte layer, a green anode-side gas collection interconnect layer in contact with the green anode layer, and a green cathode-side feed gas distribution interconnect layer in contact with the green cathode layer; and (b) sintering the green electrochemical device by heating to yield a sintered electrochemical device comprising a plurality of sintered layers including a sintered anode-side gas collection interconnect layer in contact with the anode layer and adapted to collect oxygen permeate gas, wherein each sintered layer is bonded to an adjacent sintered layer during sintering.

In this embodiment, the sintered electrochemical device may comprise a dense sintered electrolyte layer, a porous sintered cathode layer, and a porous sintered anode layer. The sintered anode-side gas collection interconnect layer may comprise dense material and includes gas collection channels. Either or both of the green anode layer and the green cathode layer may comprise a layer of green electrode material in contact with a layer of green electrode support material.

The green electrode material may be prepared from (1) a first electrode precursor powder comprising an oxide of cerium and an oxide or oxides of one or more elements selected from the group consisting of cobalt, yttrium, gadolinium, and samarium and (2) a second electrode precursor powder comprising oxides of lanthanum, strontium, cobalt, and iron. At least a portion of the layer of green electrode support material may be prepared from an electrode support precursor powder comprising oxides of lanthanum, calcium, and manganese. At least a portion of the layer of green electrode material may be prepared from a slip comprising the first electrode precursor powder, the second electrode precursor powder, and a pore former. At least a portion of the layer of green electrode support material may be prepared from a slip comprising the electrode support precursor powder and a pore former. Any of these layers may be formed by tape casting.

In further aspects of this embodiment, (1) the green electrolyte layer may be in contact with the layer of green electrode material; (2) the green electrolyte layer may be prepared from an electrolyte precursor powder comprising oxides of cerium and cobalt and an oxide or oxides of one or more elements selected from the group consisting of yttrium, gadolinium, and samarium; (3) the layer of green electrode material may be prepared from an electrode precursor powder comprising an oxide of cerium and an oxide or oxides of one or more elements selected from the group consisting of cobalt, yttrium, gadolinium, and samarium; and (4) the surface area of the electrolyte precursor powder may be greater than the surface area of the electrode precursor powder. The surface area of the electrolyte precursor powder may be between about 3 $m^2/g$ and about 20 $m^2/g$ and the surface area of the electrode precursor powder may be between about 0.25 $m^2/g$ and about 10 $m^2/g$.

In another aspect of this embodiment, at least a portion of the green electrolyte layer may be prepared from an electrolyte precursor powder comprising an oxide of cerium and an oxide or oxides of one or more elements selected from the group consisting of cobalt, yttrium, gadolinium, and samarium. The surface area of the electrolyte precursor powder may be between about 3 m²/g and about 20 m²/g. The green electrolyte layer may comprise a peripheral region or rim prepared from an electrolyte precursor powder consisting essentially of oxides of cerium and cobalt and the dense sintered electrolyte layer may comprise a dense peripheral region or rim consisting essentially of oxides of cerium and cobalt.

In a feature of this embodiment, the green anode layer may comprise (1) a central region prepared from one or more metal oxide precursor powders and a-pore former and (2) a peripheral region prepared from material that includes a metal oxide precursor powder and excludes pore formers. The green cathode layer may comprise (1) a central region prepared from one or more metal oxide precursor powders and a pore former and (2) a peripheral region-prepared from material that includes a metal oxide precursor powder and excludes pore formers.

In another feature of this embodiment, either or both of the green anode-side gas collection interconnect layer and the green cathode-side feed gas distribution interconnect layer may be prepared from material that (1) includes an interconnect precursor powder comprising calcium carbonate and oxides of lanthanum and manganese and (2) excludes pore formers, This feature may further comprise forming gas channels in the green anode-side gas collection interconnect layer and the green cathode-side feed gas distribution interconnect layer.

The green electrochemical device of this embodiment may be assembled by (1) forming a green electrode-electrolyte layer assembly by placing the green anode layer against one surface of the green electrolyte layer, placing the green cathode layer against the other surface of the green electrolyte layer, applying a pressure in the range of 5 to 100 MPa to the layer assembly in a direction normal to the layer assembly while maintaining the temperature of the layer assembly in the range of 50 to 100° C., thereby forming a laminated electrode-electrolyte assembly; and (2) forming a green electrolyte-electrode-interconnect assembly by coating the green anode-side gas collection interconnect layer and the green cathode-side feed gas distribution interconnect layer with a solvent, placing the green anode-side gas collection interconnect layer against one surface of the laminated electrode-electrolyte assembly, placing the green cathode side gas distribution interconnect layer against the other surface of the laminated electrode-electrolyte assembly, and applying a pressure in the range of 0.1 to 50 MPa to the green electrolyte-electrode-interconnect assembly in a direction normal to the assembly.

In this embodiment, the sintered electrochemical device typically includes a porous sintered anode layer and a porous sintered cathode layer, and the method may further comprise the additional steps of forming a liquid precursor containing a powdered electrocatalyst, introducing the liquid precursor into the pores of the sintered anode and cathode layers, and heating the sintered electrochemical device to a temperature in the range of about 500° C. to about 900° C. The electrocatalyst may be selected from the group consisting of a noble metal and one or more transition metal oxides, and may comprise, for example, a material having the composition $(La_{1-y}Sr_y)_A(Co_{1-z}Fe_z)_BO_{3-\delta}$, where the ratio A/B on a molar basis is between 0.95 and 1.05, $0.2<y<0.8$, $0\leq z\leq 1$, and $\delta$ is dependent on the valence and amount of the cations in order to satisfy electroneutrality. Alternatively, the electrocatalyst may comprise a material having the composition $(La_{1-y}Sr_y)_A(Co)_BO_{3-\delta}$, where the ratio A/B on a molar basis is between 1.00 and 1.02, $0.4\leq y\leq 0.7$, and $\delta$ is dependent on the valence and amount of the cations in order to satisfy electroneutrality.

Another embodiment of the invention relates to an electrochemical device for the recovery of oxygen from an oxygen-containing feed gas, wherein the device may be made by the method comprising (a) preparing a green electrochemical device by assembling a green electrolyte layer, a green anode layer in contact with the green electrolyte layer, a green cathode layer in contact with the green electrolyte layer, a green anode-side gas collection interconnect layer in contact with the green anode layer, and a green cathode-side feed gas distribution interconnect layer in contact with the green cathode layer; and (b) sintering the green electrochemical device by heating to yield a sintered electrochemical device comprising a plurality of sintered layers including a sintered dense electrolyte layer, a sintered porous anode layer, a sintered porous cathode layer, a sintered dense anode-side gas collection interconnect layer in contact with the anode layer and adapted to collect oxygen permeate gas, and a sintered dense cathode-side feed gas distribution interconnect layer in contact with the cathode layer and adapted to distribute the oxygen-containing feed gas, wherein each sintered layer is bonded to an adjacent sintered layer during sintering.

In the electrochemical-device of this embodiment, the coefficient of thermal expansion of the sintered dense electrolyte layer may be less than the coefficient of thermal expansion of the sintered dense anode-side gas collection interconnect layer and the sintered dense cathode-side feed gas distribution interconnect layer. The sintered nonporous electrolyte layer may be in compression when the sintered electrochemical device is at temperatures in the range of about 500° C. to about 900° C. The sintered nonporous electrolyte layer may comprise $(Ce_{1-w-x}Co_wLn_xO_{2-\delta})$, where $0.001<w<0.03$, $0.05<x<0.3$, Ln is selected from the group consisting of Y, Gd, Sm, and mixtures thereof, and $\delta$ is dependent on the valence and amount of the cations in order to satisfy electroneutrality. In this sintered nonporous electrolyte layer, the values of the parameters w and x may be $0.002<w<0.006$ and $0.1<x<0.2$.

The surface areas of the sintered porous anode layer and the sintered porous cathode layer in this embodiment may be greater than about 100 cm²/g or even greater than about 1000 cm²/g. The grain size of the sintered nonporous electrolyte layer may be between about 0.1 μm and about 10 μm and more specifically may be between about 2 μm and about 5 μm.

In this embodiment, the sintered nonporous electrolyte layer may have a peripheral region comprising $Ce_{1-w}Co_wO_{2-\delta}$, where $0.001<w<0.03$ and $\delta$ is dependent on the valence and amount of the cations in order to satisfy electroneutrality. The sintered porous anode layer and the sintered porous cathode layer may comprise a two-phase composite material made from $Ce_{1-w-x}Co_wLn_xO_{2-\delta}$ and $(La_{1-y}Sr_y)_A(Co_{1-z}Fe_z)_BO_{3-\delta}$, where the ratio A/B on a molar basis is between 0.95 and 1.05, $0.001<w<0.03$, $0.1<x<0.2$, $0.2<y<0.8$, $0.1<z<0.9$, Ln is selected from the group consisting of Y, Gd, Sm, and mixtures thereof, and $\delta$ is dependent on the valence and amount of the cations in order to satisfy electroneutrality the $Ce_{1-w-x}Co_wLn_xO_{2-\delta}$ in the sintered porous cathode layer may have a volume fraction of less than about 0.50. The sintered porous anode layer and the sintered porous cathode layer may be greater than 20 volume %.

The sintered porous anode layer and the sintered porous cathode layer of this embodiment may each further comprise a peripheral non-porous region, and this peripheral non-porous region may comprise a material selected from the group consisting of $Ce_{1-w}Co_wO_{2-\delta}$, where $0.001<w<0.01$; $La_{1-y}Ca_yMn_{1+\epsilon}O_{3-\delta}$, where $0.2<y<0.8$, $0.005<\epsilon<0.05$, and $\delta$ is dependent on the valence and amount of the cations in order to satisfy electroneutrality; and a mixture of MgO and $Al_2MgO_4$. The sintered non-porous anode-side gas collection interconnect layer and the sintered non-porous cathode-side feed gas distribution interconnect layer each may comprise $La_{1-y}Ca_yMn_{1+\epsilon O3-\delta}$, where $0.2<y<0.8$, $0.005<\epsilon<0.05$, and $\delta$ is dependent on the valence and amount of the cations in order to satisfy electroneutrality.

An alternative embodiment of the invention includes an electrochemical device comprising a plurality of sintered layers including a dense electrolyte layer, a porous anode layer bonded to one side of the dense electrolyte layer, a porous cathode layer bonded to the other side of the dense electrolyte layer, a dense anode-side interconnect layer in contact with the porous anode layer and having channels therein adapted for gas flow, and a dense cathode-side feed gas distribution interconnect layer in contact with the porous cathode layer and having channels therein adapted to distribute a feed gas to the cathode layer, wherein the coefficient of thermal expansion of the dense electrolyte layer is less than the coefficient of thermal expansion of the dense anode-side interconnect layer and the coefficient of thermal expansion of the dense cathode-side feed gas distribution interconnect layer. The dense electrolyte layer is in compression when the electrochemical device is at temperatures in the range of about 500° C. to about 900° C.

A related embodiment of the invention relates to a method of making an electrochemical stack-for the recovery oxygen from an oxygen-containing feed gas comprising (a) preparing a plurality of green electrochemical cells, wherein each cell is made by assembling a green electrolyte layer, a green anode layer in contact with the green electrolyte layer, a green cathode layer in contact with the green electrolyte layer, a green anode-side gas collection interconnect layer in contact with the green anode layer, a green cathode-side feed gas distribution interconnect layer in contact with the green cathode layer, and a green end cap in contact with either the green anode-side gas collection interconnect layer or the green cathode-side feed gas distribution interconnect layer; (b) assembling a stack of the green electrochemical cells to form a green stack having a top end and a bottom end, and adding a green terminal end cap at either the top end or the bottom end of the stack; and (c) co-sintering the stack by heating to yield the electrochemical stack comprising a plurality of sintered electrochemical cells, wherein each cell includes a sintered anode-side gas collection interconnect layer in contact with the anode layer and adapted to collect oxygen permeate gas, and wherein each sintered layer is bonded to an adjacent sintered layer during sintering.

Each sintered electrochemical cell of this embodiment may comprise a plurality of sintered layers including a dense electrolyte layer, a porous anode layer bonded to one side of the dense electrolyte layer, a porous cathode layer bonded to the other side of the dense electrolyte layer, a dense anode-side interconnect layer in contact with the porous anode layer and having channels therein adapted for gas flow, and a dense cathode-side feed gas distribution interconnect layer in contact with the porous cathode layer and having channels therein adapted to distribute a feed gas to the cathode layer, wherein the coefficient of thermal expansion of the dense electrolyte layer is less than the coefficient of thermal expansion of the dense anode-side gas collection interconnect layer and the coefficient of thermal expansion of the dense cathode-side feed gas distribution interconnect layer. The dense electrolyte layer of any sintered electrochemical cell may be in compression when the electrochemical stack is at temperatures in the range of about 500° C. to about 900° C.

DETAILED DESCRIPTION OF EMBODIMENTS OF THE INVENTION

Figure 1:
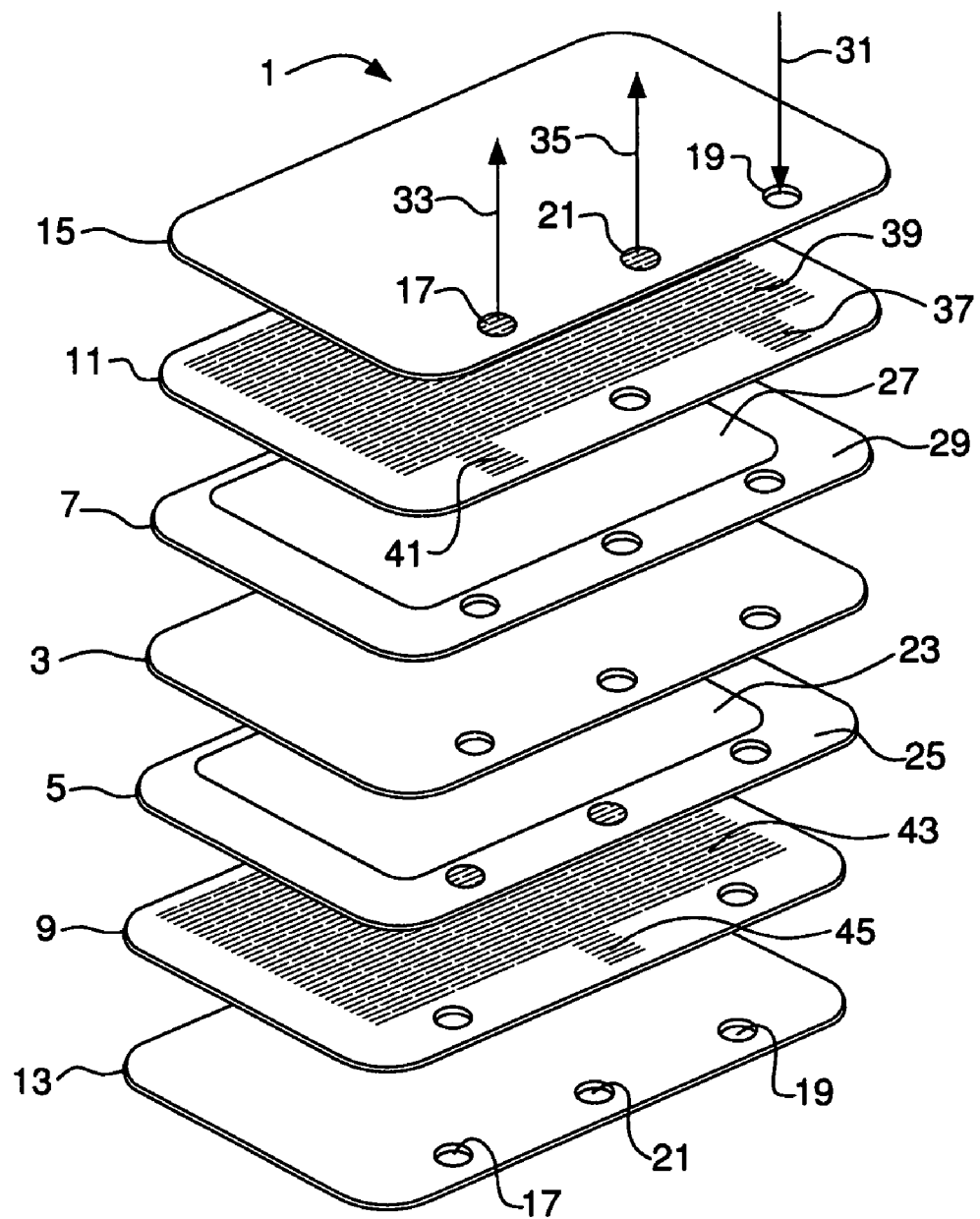
FIG. 1 is an exploded view of an exemplary co-sintered electrochemical cell utilizing an embodiment of the invention.

High efficiency in the operation of electrochemical gas separation devices and electrochemical oxidation reactor systems may be obtained by minimizing the electrical resistance in each electrochemical cell. The electrical resistance typically is a function of the choice of electrode material, the surface area of the electrode material, and the methods of contact or bonding at the interfaces between the layers in the cell, especially the bonding between the electrode and electrolyte layers. Embodiments of the present invention address the need for minimizing cell resistance by providing methods to co-sinter entire green cell and green stack assemblies without the use of glassing, brazing, or other bonding materials at the layer interfaces. This co-sintering process converts the green layers to appropriate dense and porous sintered layers while simultaneously bonding the layers together to form complete sintered cell and stack assemblies for electrochemical gas separation devices. These embodiments of the invention may be applied to electrochemical devices that utilize an electrolyte material to transport oxygen ions. For example, these embodiments may be utilized in (1) electrically-driven or pressure-driven electrochemical devices for the removal or recovery of oxygen from an oxygen-containing gas or (2) electrochemical reactor systems for producing synthesis gas or other oxidized hydrocarbons from an oxygen-containing gas and a hydrocarbon-containing gas.

The operating life of an electrochemical device depends to a great extent on the mechanical integrity of the individual layers in each cell and the seals between the individual layers. Maintaining the mechanical integrity of the electrolyte layer, which typically is the thinnest of the layers in a cell, is of particular importance in extending the operating life of the device. This issue is addressed by another embodiment of the invention in which the compositions of the layers in each cell are selected to give coefficients of thermal expansion which differ between the electrolyte layer and other layers in the cell such that the electrolyte layer is always in compression at the device operating temperature. This embodiment of the invention may be applied to any electrochemical device having an electrolyte material that transports oxygen ions. For example, this embodiment may be utilized in (1) an electrically-driven or pressure-driven device for the removal or recovery of oxygen from an oxygen-containing gas, (2) a device for producing synthesis gas or other oxidized hydrocarbons from an oxygen-containing gas and a hydrocarbon-containing gas, or (3) a solid oxide fuel cell that generates electric power from an oxygen-containing gas and an oxidizable fuel.

The mechanical integrity of an electrochemical gas separation device also may be affected by the methods of fabricating the individual green layers and by the methods of assembling the green components before co-sintering the cells and stack. Improved methods of fabrication and assembly are addressed by other embodiments of the invention as described below.

In the present disclosure, the term "sinter" means the process of heating or firing a green body comprising compacted particulate or powdered material to promote necking or bonding and subsequent densification of the particles to form a sintered coherent article having a desired set of properties. The green body may comprise, for example, particulate metal oxides and optionally one or more organic and/or inorganic materials such as slurrying liquids, solvents, surfactants, binders, plasticizers, pore formers, and the like. The term "green" describes a body comprising compacted particulate or powdered material that has not been heated to a temperature sufficient to neck or bond the particles in the body, i.e., that has not been heated to a temperature sufficient to sinter the body. The term "sintering temperature" is defined as the highest temperature reached during the processing step that bonds the particles together and allows further densification in specific regions of the structure. The term "co-sinter" means the sintering of a green electrochemical device formed of green layers comprising at least a green electrolyte layer, a green anode layer in contact with the green electrolyte layer, a green cathode layer in contact with the green electrolyte layer, a green anode-side gas collection interconnect layer in contact with the green anode layer, and a green cathode-side feed gas distribution interconnect layer in contact with the green cathode layer.

A sintered body may be porous or dense depending on the properties of the green body (e.g., the particle size of the powder components, the sintering temperature or range of sintering temperatures of the powder components, the presence or absence of pore forming material, etc.) and the time-temperature profile used during sintering. The term "porous" as applied to a layer of sintered material means that at least a portion of the layer has through pores extending from one side to the other side wherein bulk flow or bulk diffusion of gaseous compounds or elements through the pores can occur due to differential pressure and/or differential composition across the layer. The term "dense" as applied to a layer of sintered material means that the layer has essentially no through pores. A layer may be porous throughout, dense throughout, or may have both porous and dense regions. Internal pores (i.e., closed pores that are not interconnected) may or may not be present in dense or porous layers.

A gas collection interconnect layer is defined as a layer having open slots or channels for gas flow collection from an adjacent porous layer. The gas collection interconnect layer may be made of dense or porous material; typically, the material is dense. A gas distribution interconnect layer is defined as a layer having open slots or channels for gas flow distribution to an adjacent porous layer. The gas distribution interconnect layer may be made of dense or porous material; typically, the material is dense. An anode-side interconnect layer in an electrochemical device is defined as a layer in contact with an electrolyte layer and adapted for either (1) distributing gas to the anode side of the electrolyte layer and withdrawing gas from the anode side of the electrolyte layer or (2) withdrawing gas from the anode side of the electrolyte layer. When the electrochemical device is designed and operated for the separation of oxygen from an oxygen-containing gas, the anode-side interconnect layer is an anode-side gas collection interconnect layer in contact with the anode layer and adapted to collect oxygen permeate gas from the anode.

A precursor powder is defined as one or more powdered materials used to make a green body used in the fabrication of an electrochemical device. A slip is defined as a fluid mixture of precursor powder and one or more organic and/or inorganic materials such as slurrying liquids, solvents, surfactants, binders, plasticizers, pore formers, and the like. A pore former is defined as a particulate material that volatilizes or reacts with the atmosphere during the heating of a green body to a temperature below the green body sintering temperature to create pores in the green body. Surface area is defined as the surface area measured by the well-known multi-point BET method.

The term "laminate" or "laminating" is defined as the process of assembling green layers by placing the surfaces of the green layers in contact with one another with or without the use of solvents, liquid joining agents, heat, and/or pressure. Lamination may be effected at temperatures below the sintering temperature or temperatures of the green bodies. An electrocatalyst is defined as a material that promotes the exchange of molecular and ionic oxygen. The coefficient of thermal expansion is defined as the change in length of a material divided by the initial length multiplied by the temperature range over which the measurement was made, and the coefficient may be measured using a dilatometer. The term "porosity" is defined as the total volume of interconnected pores (i.e., pores open to gas flow) and isolated pores (i.e., pores closed to gas flow) within a structure as a % of the volume of the structure. The term "electrochemical device" is defined as a chemical reactor which functions due to the movement of charged species through components of the reactor.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

In a layered electrochemical device, the biaxial strength of a brittle electrolyte layer increases with the square of the electrolyte thickness while the electrolyte resistance decreases as thickness decreases. In order to achieve both low electrolyte resistance and high component strength, the electrolyte typically is supported on a porous anode, a porous cathode, or is sandwiched between the porous electrodes. In an electrochemical device for the recovery of oxygen from an oxygen-containing gas, oxygen evolution at the anode may cause delamination between the electrolyte and the seal on the anode side of the cell. U.S. Pat. No. 6,042,703 addresses the use of offset electrodes to minimize stray anodic current. In such a state-of-the-art cell, silver is used as a conformal layer between electrodes and interconnect and as a heat transfer medium. After extended time at temperature under an applied or induced voltage, however, silver may migrate and reduce the effectiveness of the offset electrodes, resulting in possible seal failures on the anode side of the cell. The present invention eliminates the need for silver and minimizes stray current at the anode-electrolyte interface. The co-sintered structure described below leads to a supported electrolyte layer that can withstand differential pressure and has low area specific resistance (ASR) so that power is minimized.

The ability to co-sinter a green device having integral electrodes, electrolytes, and interconnects allows the formation of intimate contact and bonding between porous and dense components, thereby increasing the strength of the stack. It also allows the use of thermal expansion mismatch between the interconnect and electrolyte layers to place the electrolyte under residual compression at operational temperatures. Having an electrolyte layer under residual compression protects this critical component from damage, since any damage to the electrolyte layer compromises product purity.

In order to co-sinter a cell or stack of cells to yield a device with the required properties, it is important to fabricate the layers of the device using chemically compatible materials. The selection of the electrolyte material affects the choice of the materials of the other components, since all materials must be chemically compatible at the layer interfaces. Yttria or lanthanide-doped ceria, for example, make excellent ionic conductors and may be used for the electrolyte in devices for oxygen separation. The ionic conductivity of this material increases with increasing level of Ln, where Ln represents dopant selected from one or more of the elements Y, La, Pr, Nd, Sm, Eu, Gd, Tb, Dy, Ho, Er, Tm, Yb and Lu. The most common dopants are Gd, Sm, and Y, and it is possible to use a combination of dopants. The role of dopant size on the ionic conductivity of ceria has been studied extensively and it is well known that $Sm^{3+}$ and $Gd^{3+}$ are the dopants which give the highest ionic conductivity (see H. Inaba and H. Tagawa, Review: Ceria-based Solid Electrolytes," *Sol. St. Ionics* 83, 1-16 (1996)). $Y^{3+}$ has also received recent attention as a dopant since it is thought to be less expensive, even though one sacrifices some ionic conductivity in comparison to $Sm^{3+}$ (see J. Van Herle et al. "Sintering. Behavior and Ionic Conductivity of Yttria-Doped Ceria," *J. Europ. Ceram. Soc.* 16, 961-73 (1996)). The present invention is not dependent on the type of dopant since any dopant type or mixture of dopants can be used. While the amount of dopant advantageously is between about 10 mol % and about 20 mol %, more or less dopant may be used for workable electrolytes.

In order to limit chemical reactivity between the layers during co-sintering, it is desirable to minimize the sintering temperature. Cost constraints at the present time may limit the use of nanomaterials to thin electrolytes and electrodes, since such powders may be too expensive for bulk use. It is well known, however, that small additions of transition elements such as Co and Fe are effective in lowering the sintering temperature of ceria (see, for example, C. M. Kleinlogel and L. J. Gaukler, "Mixed Electronic-Ionic Conductivity of Cobalt Doped Cerium Gadolinium Oxide," *J. Electroceramics* 5[3]231-43 (2000) and T. Zhang, P. Hing, H. Huang, and J. Kilner, "Sintering and Grain Growth of Co-Doped $CeO_2$ Ceramics," *J. Europ. Ceram. Soc.* 22, 27-34 (2002)). The p-type electronic conductivity has a much higher activation energy than the oxygen vacancy contribution for ionic conductivity (see D. P. Fagg, V. Kharton, and J. R. Frade, "P-Type Electronic Transport in $Ce_{0.8}Gd_{0.2}O_{2-\delta}$. The Effect of Transition-Metal Oxide Sintering Aids," *J. Electroceramics* 9[3], 199-207 (2003)), thereby allowing such materials to be effectively used as membranes at temperatures on the order of 750° C. and below.

In embodiments of the present invention, the dense electrolyte may comprise ceria and may have a composition of $(Ce_{1-w-x}Co_wLn_xO_{2-\delta})$ where $0.001<w<0.03$, $0.05<x<0.3$, Ln is Y, Gd, Sm, or mixtures thereof, and $\delta$ is dependent on the valence and amount of the cations in order to satisfy electroneutrality in the fluorite structure. Co may enhance the sintering activity and Ln may increase the ionic conductivity. Optionally, $0.002<w<0.006$ and $0.1<x<0.2$. These small additions of ceria make it possible to sinter the electrolyte to densities greater than 95% of theoretical at temperatures below 1350° C. when using starting powders having surface areas less than about 10 $m^2/g$. The requirement for inexpensive starting materials, however, makes it advantageous to use starting materials with an average particle diameter of greater than about 0.01 μm or even greater than about 0.1 μm. This particle size requirement means that surface areas may be below about 30 $m^2/g$ and even below about 10 $m^2/g$ in order to reduce the cost of the raw materials.

The electrodes advantageously may have a surface area (i.e., specific surface area) above about 100 $cm^2/g$ after firing and possibly above about 1,000 $cm^2/g$ after firing. The sintering temperature may be below 1400° C. and advantageously may be below 1350° C. with sintering times of less 10 hours and possibly less than 5 hours. The grain size of the electrolyte after firing may be between about 0.1 μm and about 10 μm and advantageously may be between about 2 μm and about 5 μm. Grain size is defined as the mean grain size as measured by the line intercept method on polished and etched surfaces, applying a multiplication factor of 1.5 to the mean intercept length to compensate for sectioning along a mean chord of length less than the maximum.

Numerous methods are known for applying thin electrolytes to previously bisqued or sintered support structures including dip coating, spin coating, centrifugal casting, spray coating, etc., but in the present invention a much simpler approach is used in order to make a co-sintered device. The electrolyte may be made as a separate green body by tape casting, and the layer thickness may be controlled by the solids content in the slip and the height of the doctor blade used for casting. Sintered thickness ranging between about 2 μm and about 100 μm can be produced by this technique. In embodiments of the present invention, the thickness of the electrolyte may be less than about 100 μm and even less than about 50 μm. It is not necessary to pre-react the constituents since in-situ reaction is acceptable. It is therefore possible to mill $CeO_2$, the lanthanide dopant ($Y_2O_3$, $Sm_2O_3$, $Gd_2O_3$, or mixtures thereof), and a source of cobalt (e.g., $Co_3O_4$ or CoO) to the desired surface area or particle size distribution prior to making up the slip for batching. Aqueous or nonaqueous carriers may be used for the preferred binder, plasticizer, and dispersant in the slip casting system. Other methods of fabricating the green components may be used including calendaring, pressing, extrusion, slip or gel casting, injection molding, or other methods known in the art.

The electrolyte layer may have a peripheral sealing region or rim comprising material having low ionic conductivity and a similar coefficient of thermal expansion as the interior region. This peripheral sealing material may be $Ce_{1-w}Co_wO_{2-\delta}$, where $0.001<w<0.01$ and optionally where $0.002<w<0.006$. The absence of Y, Sm, Gd, or mixtures thereof, in the fluorite structure lowers the ionic conductivity of the seal. This seal material sinters at the same temperature as the electrolyte may be prepared in an identical manner, with the exception that the lanthanide is not included in the processing. The rim width will be dependent on the specific electrode design.

The dense electrolyte is in intimate contact with the porous electrodes. Prior to co-sintering, both electrolyte and electrodes are made from green (unfired) tape. The purpose of the electrodes is to allow oxygen exchange with the air on the cathode side of the cell and to promote ion recombination to produce molecular oxygen on the anode side of the cell. Mixed ionic-electronic conductors (MIEC) make excellent electrodes, especially when some of the electrolyte material is incorporated into its structure (see, for example, U.S. Pat. Nos. 5,543,239 and 6,682,842 or V. Dusastre and J. A. Kilner, "Optimization of Composite Cathodes for Intermediate Temperature SOFC Applications," *Sol. St. Ionics* 126, 163-74 (1999)). In the case of oxygen generation, it is possible to use the same material for both the anode and the cathode.

The porous electrodes in embodiments of the present invention may comprise a two-phase composite made from a material having a composition $Ce_{1-w-x}Co_wLn_xO_{2-\delta}$ (referred to as ceria) and a material having a composition $(La_{1-y}Sr_y)_A(Co_{1-z}Fe_z)BO_{3-\delta}$ (referred to as LSCF) where the ratio A/B on a molar basis is between 0.95 and 1.05, $0.001<w<0.03$, $0.1<x<0.2$, $0.2<y<0.8$, $0.1<z<0.9$, Ln is Y, Gd, Sm, or mixtures thereof, and $\delta$ is dependent on the valence and amount of the cations in order to satisfy electroneutrality. The volume fraction of ceria may be less than about 0.75 and advantageously less than about 0.4, where volume fraction is defined as the volume of one solid phase divided by the sum of all solid phases present. The porosity in the electrodes may be greater than about 20 vol % and possibly greater than 30 vol %. The strength of the porous electrodes may be greater than about 1 MPa and advantageously greater than about 5 MPa, where strength is defined as the biaxial strength measured on an unconstrained disk by the uniform pressure on disk technique (see D. K. Shetty, A. R. Rosenfield, W. H. Duckworth and P. R. Held, "A Biaxial-Flexure Test for Evaluating Ceramic Strengths," *J. Am. Ceram. Soc.* 66[1], 36-42 (1983)). The area specific resistance (ASR) from the two electrodes may be less than about $0.2\ \Omega\text{-cm}^2$ and possibly less than about $0.1\ \Omega\text{-cm}^2$.

The purpose of the ceria is to lower the thermal expansion of the LSCF. The coefficient of thermal expansion (CTE) of the electrode generally has little influence on the residual stresses in the electrolyte, since the electrode layer is thin relative to the other layers in the structure. It is desirable, however, to avoid high chemical expansivity in the electrodes in order to minimize the tensile residual stress in the electrode layers. Any changes in the thermal expansion rate of the electrode to improve chemical performance should have a minimal structural effect. It is desirable that the LSCF form a continuous phase so that it has electrical conductivity independent of the use of post-fabrication infiltration of an electrocatalyst.

The packing density of the anode should be similar to that of the electrolyte and cathode in the green state, but the cathode and anode typically have through porosity exceeding 20 volume % after sintering, whereas the electrolyte is dense and has essentially no through porosity after sintering. Volume % porosity is defined as the actual density of the ceramic layer divided by theoretical density of a ceramic layer having no pores. The volume % porosity therefore includes both open and closed porosity. The desired volume % porosity may be accomplished by controlling the particle size and packing density after removal of the organic content. The particle size and agglomerate size of particles in the green electrodes (cathode and anode) are larger than the particle size and agglomerate size of particles in the electrolyte. Larger particles and harder agglomerates in the green electrodes, relative to the green electrolyte, reduce the sintering activity of the electrodes. A pore-former is added as a fugitive material to the electrodes in order to reduce their green density after removal of the organics at low temperatures and prior to the onset of sintering. Fugitive materials include carbon, graphite, starch, cellulose, or other organics which are removed cleanly in air or inert environments. The degree of sintering of the electrodes also can be controlled by limiting or enhancing their sinterability by control of rate-limiting diffusion. At high temperatures, A-site diffusion of cations is slower than B-site diffusion. Accordingly, the ratio A/B of the LSCF can be made greater than 1.0 in order to hinder sintering of the electrode and keep the particle size small.

The surface area of the ceria used in the electrodes should be smaller than that used in the electrolyte. This may be achieved most economically by taking the milled $CeO_2$, lanthanide dopant ($Y_2O_3$, $Sm_2O_3$, $Gd_2O_3$, or mixtures thereof), and cobalt (e.g., $Co_3O_4$ or CoO) powder used to make the electrolyte precursor powder and calcining it to control its surface area. The surface area (or alternatively the particle size distribution) desired for the ceria in the electrode will depend upon the surface area (or alternatively the particle size distribution) of the ceria to be used in the electrolyte. For example, if the surface area of the ceria for the electrolyte is in the range of about 4-6 $m^2/g$, then the surface area of the ceria in the electrodes should be in the range of about 1-3 $m^2/g$. The MIEC powder can be prepared by wet chemical methods or by reacting inexpensive raw materials. Precise batching is required to control the A/B ratio precisely.

An inexpensive oxide route may be used to make the LSCF by mixing oxides or carbonates (e.g., $La_2O_3$, $SrCO_3$, $Co_3O_4$, and $Fe_2O_3$) in the desired ratios after determining their losses on ignition. Milling to get intimate mixing, followed by calcination, is an acceptable method for making these compositions. Higher oxygen conductivity may be achieved by increasing the amount of Sr relative to La and the amount of Co relative to Fe. In order to limit the chemical expansivity (see S. B. Adler, "Chemical Expansivity of Electrochemical Ceramics," *J. Am. Ceram. Soc.* 84[9], 2117-19 (2001)) of the LSCF, the Co is generally less than Fe on a molar basis and La is greater than Sr on a molar basis. Thermal expansion decreases as Sr is replaced by La and is relatively insensitive to the substitution of Fe for Co. Many different compositions have been shown to work as electrodes in the present embodiments; composition is as important as the surface area and processing methods in achieving the desired properties of the electrodes.

The calcined ceria and LSCF powders are intimately mixed prior to the slip casting of the green electrode tapes. This is the final opportunity to control the particle size distribution and normally is accomplished in the presence of a pore-former such as carbon, graphite, starch, cellulose, or other organic components that are removed cleanly in air or inert environments during sintering. Microcrystalline cellulose works very well as a pore-forming material and is available in a range of particle sizes. Slip preparation is similar to that of the electrolyte tape with conventional tape casting used to prepare the electrode tapes.

The electrodes may have a dense sealing peripheral region or rim to control the purity of the oxygen produced on the permeate side of the cell. The rim material should sinter dense and may be made of $Ce_{1-w}Co_wO_{2-\delta}$, $La_{1-y}Ca_yMn_{1+\epsilon}O_{3-\delta}$, (LCM), MgO—Al$_2$MgO$_4$ (see for example U.S. Pat. Nos. 6,042,703 and 6,117,288), or any other suitable expansion-matched material. For example, rim material may be made of Ce$_{1-x}$Co$_x$O$_2$ (0≦x≦0.05, where cobalt is used as a sintering aid), which has resistance to the flow of both electrons and oxygen ions. Ce$_{1-x}$Co$_x$O$_2$ may be used advantageously for the rims to give added protection to electrical short circuiting of a cell and to serve as a barrier to diffusion of transition metal cations into the rim region of the electrolyte, which may introduce electronic conductivity in the electrolyte and short circuit the cell as a result. The rim material preferably is a poor ionic conductor, and its electronic conductivity should be minimized. The rim material should sinter to greater than 95% of theoretical in the same temperature range as the electrolyte. Offset electrodes may be easily incorporated into this design by controlling the width of the rims.

The electrodes are in contact with the interconnect, which is an excellent electronic conductor and a poor ionic conductor. LCM (La$_{1-y}$Ca$_y$Mn$_{1+\epsilon}$O$_{3-\delta}$), where 0.2<y<0.8, 0.005<ϵ<0.05, and δ is dependent on the valence and amount of the cations in order to satisfy electroneutrality, is an acceptable interconnect material (see U.S. Pat. No. 6,811,914). The average grain size of the LCM may be less than about 10 μm and even less than about 5 μm. This interconnect material should sinter dense within 100° C. of the electrolyte material sintering temperature. Because the interconnect material makes up the bulk of the cell, the material should be inexpensive to make and readily sinterable. While it is possible to grade the composition of different interconnect layers, it is more desirable to use a single composition. The coefficient of thermal expansion (CTE) of the interconnect layer or layers is an important parameter, since its value relative to the CTE of the electrolyte is important in designing a device in which the electrolyte layer is under residual compression at device operating temperatures. Increasing Ca, relative to La, increases the expansion properties of the LCM in the interconnect.

The purpose of porosity in the electrode support layer is to provide a support for the electrode layer and to provide open pores for the flow of air on the cathode side and oxygen on the anode side of the cell. Larger porosity or channels in the channeled gas collection interconnect layer or layers can be used to limit gas phase polarization or to limit gas pressure drop. Porosity can be added with pore formers, whereas slots, holes, channels, or other features may be added easily in the green state by punching, cutting, shearing, or other means to remove material prior to lamination. Laser cutting is an effective method for introducing features in cast green interconnect sheets. This allows the rims to densify and avoids the use of pore formers in the interconnect layer.

The interconnect powder may be produced by milling CaCO$_3$, La$_2$O$_3$, and Mn$_3$O$_4$ and then calcining the material to form the solid solution of LCM (La$_{1-y}$Ca$_y$Mn$_{1+\epsilon}$O$_{3-\delta}$). The LCM powder then is further milled to control the surface area (or the particle size distribution) in order to control sinterability. The particle size distribution of the LCM advantageously may be similar to that of the electrolyte material such that the electrolyte and interconnect layers both have similar green density and shrinkage during sintering. The LCM is prepared for slip casting in a similar manner to that of the electrolyte, but is cast 5-20 times thicker. Laser cutting of features is performed after the tapes are dry.

Dilatometry of individual layers can be used in order to determine the shrinkage of unconstrained layers. The embodiments of the present invention, however, are directed to the co-sintering of a green multi-layer device, and this involves constrained sintering. Constrained sintering takes into account the influence of surrounding layers on the densification behavior so that it may be different than sintering of the same composition without constraint. The co-sintering of each cell yields an electrolyte layer, electrode layer rims, and interconnect layers that are dense (i.e., have essentially no through pores) and electrode layers that are porous (i.e., have through pores). This is made possible by careful tailoring of the properties of the green tapes by controlling the particle size distributions of the powder materials and the particle packing in fabricating the green component layers.

The green layers are laminated or joined together in the green state prior to co-sintering. This may be accomplished with temperature and pressure for unslotted layers or with lower pressure and solvent for slotted interconnect layers. The exact conditions will be dependent on the selection of the binder, plasticizer, and amount of organic used in the green tapes. In one embodiment, the green electrolyte layer is joined to the green electrode layers (which typically have rims as earlier discussed) using heat and pressure. This may be accomplished by applying a pressure in the range of about 5 to 100 MPa to the layer assembly in a direction normal to the layer assembly (i.e., uniaxially) while maintaining the temperature of the layer assembly in the range of about 50 to 100° C., thereby forming a laminated electrode-electrolyte assembly.

Constrained dies may be used during pressing to limit flow in the x-y directions (i.e., parallel to the layer surfaces). Slotted interconnect layers then are coated with a solvent which dissolves some of the plasticized binder in the tape, and a coated slotted layer is joined to each surface of the laminated electrode-electrolyte assembly. Typical joining conditions for this step are ambient or near-ambient temperatures (for example, between about 15 and 30° C.) and pressures in the range of about 0.1 MPa to about 50 MPa in a direction normal to the layer assembly. Lower temperatures and pressures limit slot movement and the amount of solvent also can be controlled in order to keep the slots open. Constrained dies are not necessary for these steps.

The resulting assembled green cell also may be pressed isostatically rather than uniaxially. Isostatic pressing uses hydrostatic pressure which is transmitted through a medium that eliminates contact with the fluid; warm isostatic pressing combines heat and hydrostatic pressure. Warm isostatic pressing is a variant on the above processing technique, but is not required in order to achieve excellent joining of the layers in the green cell assembly. The use of vacuum equipment to remove air allows for improved joining of the layers. A shear punch may be used to trim the outside of the green cell assembly.

The green cell assembly may be placed on a suitable setter (such as, for example, MgO, CeO$_2$, or Al$_2$O$_3$/LCM) and heated or fired in air using a selected time-temperature profile to temperatures below about 1400° C. in order to co-sinter the entire green cell assembly in a single step. The lower temperature portion of the heating profile is determined using thermal gravimetric analysis (TGA) to allow binders and pore-formers to be removed at a near constant rate to avoid delamination of the cell assembly. The maximum sintering temperature typically is kept below about 1350° C. for periods of less than five hours in order to preserve the surface area in the electrodes. The electrodes should have a surface area (i.e., specific surface area) above about 100 cm$^2$/g after sintering and advantageously above about 1,000 cm$^2$/g after sintering. The proper sintering temperature can be determined definitively by measuring the performance of the co-sintered cell and by examining the microstructures of the individual layers in the co-sintered cell.

The first characterization method is leak testing of the co-sintered cell, which can be accomplished by pressurizing with helium to ensure that there is no communication at room temperature between the anode and cathode sides of the cell and that all seals are leak-free. The grain size of the electrolyte is an important property in determining its conductivity, and the mean grain size after firing should be between about 0.1 µm and about 10 µm, and advantageously between about 2 µm and about 5 µm. This may be determined by co-sintering a companion part which can-be cross-sectioned, etched, and examined using microscopy.

The porosity in the thin electrode layers can be difficult to quantify, since the electrode pore volume is small relative to the volume of the slots or channels in the interconnect layers and in other features in the co-sintered cell. An effective method for quantifying the electrode cell volume is to prepare a co-sintered companion part and infiltrate it with an epoxy prior to cross-sectioning and polishing. Standard image analysis techniques can be used to quantify the size and distribution of the porosity in the electrodes, as well as the total area fraction of porosity. For equiaxed porosity, wherein the grains have equal dimensions in all directions, the area fraction is equal to the volume fraction. Care should be taken to ensure that several areas are sectioned so that the data are representative of the sample.

When a suitable microstructure has been obtained, it is straightforward to enhance the eventual operation of the cell with a single catalyst infiltration step prior to testing the electrochemical performance of the cell. An electrocatalyst may be infiltrated into the pores of the porous electrodes to form active catalysis nanoparticles in the pores between the coarser electrode particles. The electrocatalyst may be selected from a noble metal or metal oxide containing a transition element; A useful electrocatalyst for this application is a material with the composition $(La_{1-y}Sr_y)_A(Co_{1-z}Fe_z)_BO_{3-\delta}$, where the ratio A/B on a molar basis is between 0.95 and 1.05, $0.2<y<0.8$, $0 \leq z \leq 1$, and $\delta$ is dependent on the valence and amount of the cations in order to satisfy electroneutrality. Another useful electrocatalyst is $(La_{1-y}Sr_y)_A(Co)_BO_{3-\delta}$, where the ratio A/B on a molar basis is between 1.00 and 1.02, $0.4 \leq y \leq 0.7$, and $\delta$ is dependent on the valence and amount of the cations in order to satisfy electroneutrality. The electrocatalyst may be introduced into the electrodes as a liquid precursor using vacuum infiltration into the co-sintered electrochemical cell, after which the electrocatalyst is calcined in-situ by heating to the operating temperature of the oxygen separation device (typically 700° C. to 800 C).

The area specific resistance (ASR) of the co-sintered cell may be measured using standard impedance spectroscopy to obtain both the non-ohmic (electrode) and ohmic (electrolyte) resistances. The ASR of the electrochemical cell should be below about 0.5 Ω-cm², and advantageously below about 0.25 Ω-cm², after infiltration with a wash coat of a mixed conductor and testing at 750° C. The ASR from the two electrodes should be less than about 0.2 Ω-cm² and advantageously less than about 0.1 Ω-cm² under the same test conditions.

Finally, the oxygen pressure drop on the cathode side of the co-sintered cell and oxygen evolution conditions on the anode side of the co-sintered cell can be measured. The pressure drop should be measured and compared with the calculated system design. Oxygen purity is measured using an oxygen analyzer and should be greater than 99.9%. The flow rate is easily determined and should be compared with the predicted value.

An exemplary electrochemical cell utilizing embodiments of the present invention as described above is illustrated in the exploded view of FIG. 1, which is not necessarily to scale. This electrochemical cell is designed for recovering oxygen from air or any other oxygen-containing gas. Cell assembly 1 comprises electrolyte layer 3, anode layer 5, cathode layer 7, anode-side gas collection interconnect layer 9, cathode-side gas distribution interconnect layer 11, lower end cap 13, and upper end cap 15. Each of electrolyte layer 3, anode layer 5, cathode layer 7, lower end cap 13, and upper end cap 15 have three through openings or holes through an outer region of the layer, and these holes in the assembled co-sintered cell provide interior gas flow manifolds as later described. These holes include first outer hole 17, second outer hole 19, and inner hole 21. Anode layer 5 includes interior region 23 and outer peripheral region or rim 25. Cathode layer 7 includes interior region 27 and outer peripheral region or rim 29.

The materials in electrolyte layer 3, anode-side gas collection interconnect layer 9, cathode-side gas distribution interconnect layer 11, lower end cap 13, upper end cap 15, anode rim 25, and cathode rim 29 are dense after co-sintering. The materials in anode interior region 23 and cathode interior region 27 are porous after co-sintering.

Anode inner region 23 comprises two sublayers (not shown separately); the first anode sublayer is located adjacent electrolyte layer 3 and the second anode sublayer is located adjacent anode-side gas collection interconnect layer 9. The second anode sublayer provides support for the first anode sublayer. Cathode inner region 27 comprises two sublayers (not shown separately); the first cathode sublayer is located adjacent to electrolyte layer 3 and the second cathode sublayer is located adjacent to cathode-side gas distribution interconnect layer 11. The second cathode sublayer provides support for the first cathode sublayer. These anode and cathode sublayers are bonded to each other and to the adjacent layers during co-sintering and are porous after co-sintering.

Figure 2A:
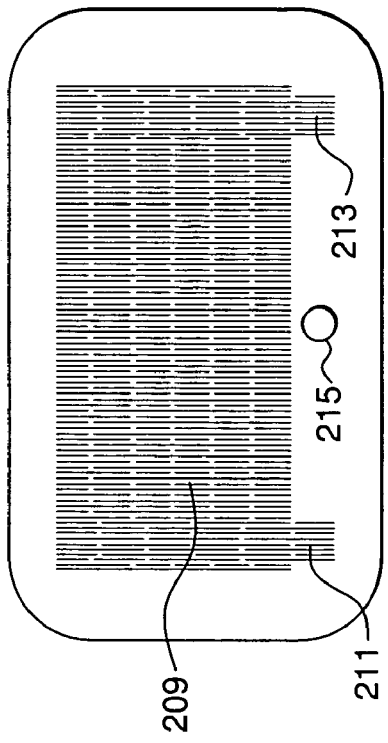
FIG. 2A is a plan view of a slotted cathode-side feed gas distribution interconnect sublayer in the exemplary cell of FIG. 1.
Figure 2B:
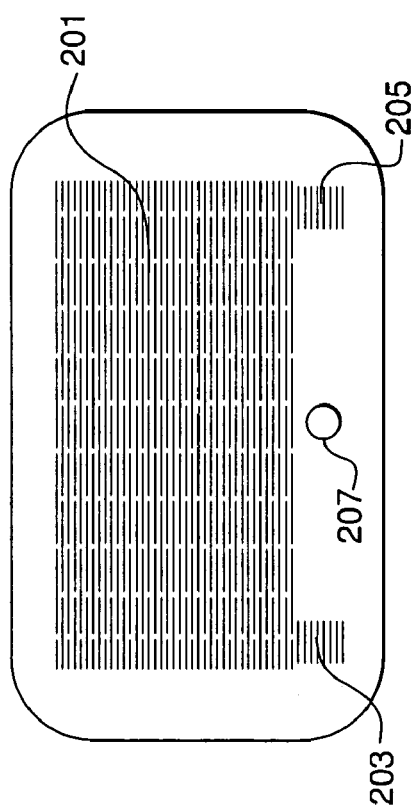
FIG. 2B is a plan view of another slotted cathode-side feed gas distribution interconnect sublayer in the exemplary cell of FIG. 1 having slots orthogonal to the slots in FIG. 2A.

Cathode-side gas distribution interconnect layer 11 may be fabricated from two slotted sublayers shown in FIGS. 2A and 2B. The sublayer of FIG. 2A has a plurality of slots through the layer in central slotted region 201 that are formed from a green layer by punching, laser cutting, or any other appropriate method. Central slotted region 201 includes first outer tab region 203 and second outer tab region 205. Inner opening or through hole 207 is formed between first outer tab region 203 and second outer tab region 205. The sublayer of FIG. 2B has a plurality of slots through the layer in central slotted region 209 that are formed from a green layer by punching, laser cutting, or any other appropriate method. The slots in the sublayer of FIG. 2B are orthogonal to the slots in the sublayer of FIG. 2A. Central slotted region 209 includes first outer tab region 211 and second outer tab region 213. Inner opening or through hole 215 is formed between first outer tab region 211 and second outer tab region 213.

Figure 3A:
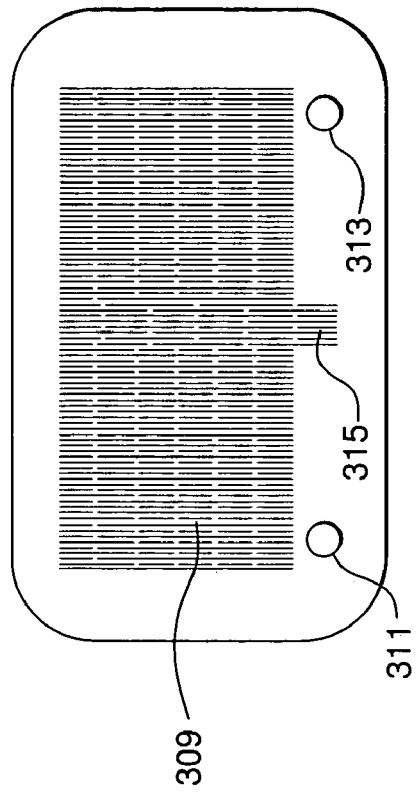
FIG. 3A is a plan view of a slotted anode-side gas collection interconnect sublayer in the exemplary cell of FIG. 1.
Figure 3B:
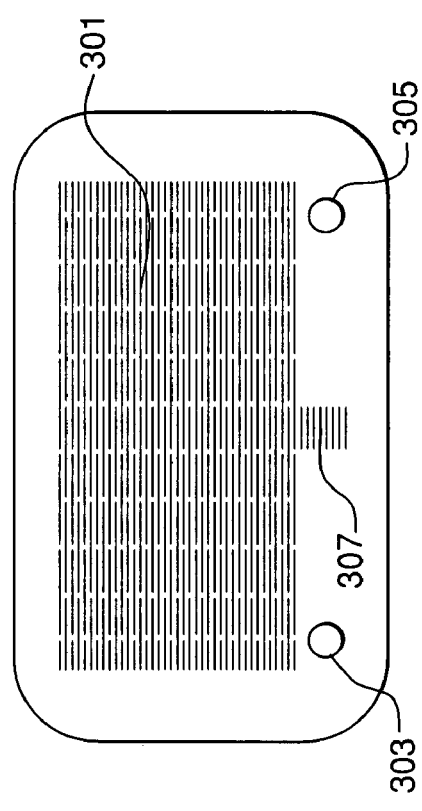
FIG. 3B is a plan view of another slotted anode-side gas collection interconnect sublayer in the exemplary cell of FIG. 1 having slots orthogonal to the slots in FIG. 3A.

Anode-side gas distribution interconnect layer 9 is fabricated from two slotted sublayers shown in FIGS. 3A and 3B. The sublayer of FIG. 3A has a plurality of slots through the layer in central slotted region 301 that are formed from a green layer by punching, laser cutting, or any other appropriate method. Central slotted region 301 includes inner tab region 307 located between first outer opening or through hole 303 and second outer opening or through hole 305. The sublayer of FIG. 3B has a plurality of slots through the layer in central slotted region 309 that are formed from a green layer by punching, laser cutting, or any other appropriate method. The slots in the sublayer of FIG. 3B are orthogonal to the slots in the sublayer of FIG. 3A. Central slotted region 309 includes inner tab region 315 located between first outer opening or through hole 311 and second outer opening or through hole 313.

The slotted sublayers in FIGS. 2A, 2B, 3A, and 3B are placed in the green cell assembly during green cell fabrication and the layers are joined. After co-sintering, the material in these sublayers becomes dense. During co-sintering, the cathode-side sublayers of FIGS. 2A and 2B are bonded at their interface, the lower sublayer 2A is bonded to cathode layer 7, and the upper sublayer 2B is bonded to upper end cap 15. During co-sintering, the anode-side sublayers of FIGS. 3A and 3B are bonded at their interface, the lower sublayer 3B is bonded to lower end cap 13, and the upper sublayer 3A is bonded anode layer 5. The co-sintering process yields a coherent co-sintered electrochemical cell in which each layer is bonded to an adjacent layer and each bonded interface between layers forms a gas-tight seal at the interface periphery.

The operation of the exemplary co-sintered electrochemical cell for recovering oxygen from an oxygen-containing feed gas can be described with reference to FIG. 1. Oxygen-containing feed gas stream 31 enters the cell assembly at hole 19 and a first portion of this gas flows via slotted tab region 37 into slotted interior region 39 of cathode-side gas distribution interconnect layer 11. The remaining portion of feed gas stream 19 flows through the interior manifold formed by first outer holes 19 through the remaining layers of the cell. The first portion of the feed gas flowing through slotted interior region 39 of cathode-side gas distribution interconnect layer 11 contacts porous inner region 27 of cathode layer 7, a portion of the feed gas flows or diffuses through the pores in the cathode layer, and the gas contacts the upper surface of electrolyte layer 3. The oxygen gas ionizes and permeates as ions through the electrolyte layer as is known in the art.

Oxygen-depleted non-permeate gas flows through porous inner region 27 of the cathode layer and slotted interior region 39 of cathode-side gas distribution interconnect layer 11, the non-permeate gas flows via slotted tab region 41 into the manifold formed in the cell by first outer holes 17, and the gas flows out of the cell as non-permeate gas stream 33.

Oxygen permeate gas forms at the lower surface of electrolyte layer 3 and flows through porous region 23 of anode layer 5 into interior slotted region 43 of anode-side gas collection interconnect layer 9. This high-purity oxygen permeate gas is collected in slotted region 43 of anode-side gas collection interconnect layer 9, flows via slotted tab region 45 into an interior permeate gas manifold formed by inner holes 21, and leaves the cell as permeate stream 35.

A plurality of green cells may be fabricated into a green electrochemical stack wherein each cell is made by assembling and joining green electrolyte layer 3, green anode layer 5, green cathode layer 7, green anode-side gas collection interconnect layer 9, green cathode-side gas distribution interconnect layer 11, and lower green end cap 13. The plurality of cells is assembled and joined in series by joining the green cathode side gas distribution interconnect layer 11 of one cell to the end cap of an adjacent cell, continuing with the desired number of cells, and completing the green stack by joining a terminal end cap (not shown) to the top of the stack. The terminal end cap does not have through holes 17, 19, and 21. Alternatively, each cell may fabricated with upper end cap 15 rather than lower end cap 13 and the stack completed with a terminal end cap at the lower end (not shown). The stack may include between 2 and 200 cells.

The green stack is co-sintered by heating to yield a sintered electrochemical stack comprising a plurality of sintered electrochemical cells. The co-sintering process yields a coherent co-sintered electrochemical stack in which each layer is bonded to an adjacent layer and each bonded interface between layers forms a gas-tight seal at the interface periphery. The material in the electrolyte layers, anode-side gas collection interconnect layers, cathode-side feed gas distribution interconnect layers, the anode layer rims, cathode layer rims, and the end caps are dense after co-sintering. The material in the inner regions of the anode and cathode is porous after co-sintering.

While the exemplary planar cell components described above (FIGS. 1, 2A, 2B, 3A, and 3B) are rectangular, any shape may be used for the planar cell components. For example, the components alternatively may be square, circular, or any other planar shape.

The following Examples illustrate embodiments of the present invention but do not limit the invention to any of the specific details described therein.

EXAMPLE 1

Co-Sintered Electrochemical Cell Without Slotted Layers

Green tapes required for multi-layer multi-composition laminates were made from powders that were fabricated by conventional ceramic powder processing techniques starting with the raw oxide components. Each electrode support tape was made as follows: 1000 g of 15 mm diameter YTZ media, 500 g of pre-reacted LCM ($La_{0.4}Ca_{0.6}Mn_{1.01}O_{3-\delta}$) powder possessing a surface area of about 1 $m^2$/g, 62 g microcrystalline cellulose pore former (NT013), 217.0 g toluene, and 54.3 g ethanol were added to a 1 L HDPE (High Density PolyEthylene) bottle and placed on an industrial paint shaker for ½ hour. 48.7 g of PVB (Poly Vinyl Butyral) B-98 (Solutia brand) binder and 48.7 g of BBP (Butyl Benzyl Phthalate S160) plasticizer were added to the bottle and paint shaken for another hour. The bottle was then placed on a ball mill and allowed to roll at ~50 RPM for ~12 hours. This slip was screened through a nylon mesh fabric with ~40 μm openings, degassed under vacuum, and cast onto a silicone coated Mylar carrier film (2SLK, Mitsubishi) using a doctor blade. These green electrode support tapes form a porous LCM electrode support layer after co-sintering.

Green electrode tapes were made in a procedure similar to that used to make the green LCM electrode support tapes. The powders used for the electrode tapes are summarized in Table 1, where LSCF denotes $La_{1-x}Sr_xCo_{1-y}Fe_yO_{3-\delta}$ and the number following it indicates the amount of each cation present in the formula. Loss On Ignition (LOI) data for the oxide powders were used to generate the batch sheet for the LSCF compositions. The raw oxides used to make the electrolyte powder were dried prior to batching to remove residual water.

The ingredients used to make the electrode tape slip are summarized in Table 2 and the processing steps were identical to those described for the porous LCM electrode support tape. The tape slip identified as H was processed differently than the other slips in that the powder, toluene, ethanol, and media were added to the bottle and paint shaken for 2 hours prior to adding the pore former to break up calcined agglomerates and mix the LSCF particles with the electrolyte particles. Subsequent processing was the same and included a ½ hour paint shake after adding the pore former and a 1 hour paint shake after adding the binder and plasticizer. A more homogenized micro-structure and, most importantly, lower ASR resulted from this process change compared to tape F, which was otherwise identical to tape H. These green electrode tapes were made to form a porous electrode layer after co-sintering.

TABLE 1

Component Weights and Processing Data for Electrode Tapes of Example 1

| Composition | La$_2$O$_3$ [g] | SrCO$_3$ [g] | Co$_3$O$_4$ [g] | Fe$_2$O$_3$ [g] | CeO$_2$ [g] | Sm$_2$O$_3$ [g] | Calcination Temp. [° C.]/Time | BET Surface Area [m$^2$/g] |
|---|---|---|---|---|---|---|---|---|
| LSCF 5528 | 69.43 | 62.73 | 13.60 | 54.25 | N/A | N/A | 1150/10 hrs | 0.26 |
| LSCF 7328 | 191.50 | 74.383 | 26.88 | 107.24 | N/A | N/A | 1150/10 hrs | 0.75 |
| LSCF 3728 | 84.23 | 178.123 | 27.59 | 110.06 | N/A | N/A | 1150/10 hrs | 0.60 |
| Ce$_{0.85}$Sm$_{0.15}$O$_{1.925}$ | N/A | N/A | N/A | N/A | 848.34 | 151.66 | 1375/8 hrs | 0.82 |

Green electrolyte tape was made by adding 10,350.2 g CeO$_2$, 1861.2 g Sm$_2$O$_3$, 28.6 g Co$_3$O$_4$, 36.7 g Solsperse, 60 g Sorbitan Trioleate, 1714.5 g toluene, 428.6 g PM509 ethanol, and 30 kg 15 mm diameter YTZ media to a 10 L HDPE bottle and ball milled for 6 days. A surface area of ~6.8 m$^2$/g was obtained in this mixture of raw oxide powders. A binder solution containing 819 g BBP S160, 2,056 g PVB B-79, 3,372 g toluene, and 843 g PM509 ethanol was added to the ball milled slurry and ball milled for ~12 hours. This slip was cast onto a Mylar carrier film to form a tape used to form a green electrolyte that formed a dense electrolyte layer after co-sintering with a composition of Ce$_{0.845}$Sm$_{0.15}$Co$_{0.05}$O$_{1.925}$.

Each tape layer was cut into 6 cm×6 cm squares using a rotary cutter. These squares were layered to form a symmetric stack in the following order: electrode support-electrode-electrolyte-electrode-electrode support. The layers were laminated at temperatures between 50° C. and 65° C. using an applied pressure of 24.7 MPa. The 6 cm×6 cm laminates then were cut into quarters to produce 3 cm×3 cm laminates.

Laminated green cell assemblies with dimensions of approximately 3 cm×3 cm were co-sintered using the following thermal profile: 20° C./hr to 150° C., 5° C./hr to 250° C., 10° C./hr to 350° C., 50° C./hr to 1300° C., hold at 1300° C. for 2 hours, and −50° C./hr to 25° C. The edges of the sintered laminates were ground on a ~200 µm grit wheel to a size of about 2 cm×2 cm in order to prevent the possibility of a short circuit across the thin (~50 µm) electrolyte. Half of the samples were vacuum infiltrated with a nitrate solution (pH adjusted to ~5.5 with NH$_4$OH) with a composition of La$_{0.3}$Sr$_{0.7}$Co$_{1.01}$O$_{3-\delta}$ and allowed to dry. They were then vacuum infiltrated again and allowed to dry. Silver lead wires were attached to each side of the laminates with silver paste, the coupons were heated to 750° C., and the area specific resistances (ASR) were measured using AC impedance spectroscopy. Total cell resistances ranging from 0.22 to 0.80 Ω-cm$^2$ were obtained from these coupons at 750° C. The results are summarized in Table 3. It is seen that infiltration with the nitrate solution decreased the total ASR in all coupon varieties.

TABLE 2

Component Weights and Processing Data for Electrode Tapes of Example 1

| Run ID | x in La$_{1-x}$Sr$_x$Co$_{0.2}$Fe$_{0.8}$CoO$_{3-\delta}$ | Volume Fraction Ce$_{0.85}$Sm$_{0.15}$O$_{1.925}$ | LSCF [g] | Ce$_{0.85}$Sm$_{0.15}$O$_{1.925}$ [g] | Toluene [g] | EtOH [g] | PVB (B-98) [g] | S-160 [g] | NT-013 [g] | η [cP] |
|---|---|---|---|---|---|---|---|---|---|---|
| A | 0.3 | 0.35 | 156.72 | 93.28 | 108.49 | 27.40 | 21.13 | 21.20 | 31 | 1009 |
| B | 0.3 | 0.65 | 81.89 | 168.11 | 106.39 | 26.62 | 20.73 | 20.77 | 31 | 848 |
| C | 0.7 | 0.35 | 152.45 | 97.55 | 111.68 | 28.17 | 21.76 | 21.84 | 31 | 823 |
| ○ | 0.7 | 0.65 | 77.96 | 172.04 | 108.09 | 27.06 | 21.05 | 21.15 | 31 | 770 |
| F | 0.5 | 0.5 | 116.7 | 133.3 | 109.45 | 27.36 | 21.05 | 21.05 | 31 | 1360 |
| H | 0.5 | 0.5 | 37.34 | 42.66 | 35.08 | 8.77 | 6.75 | 6.75 | 10 | N/A |

TABLE 3

Results of ASR Measurements for Example 1

| Run ID | Volume Fraction Electrolyte | x, in La$_{1-x}$Sr$_x$Co$_{0.2}$Fe$_{0.8}$O$_3$ | Infiltrated | AC Impedance Ohmic [Ω cm$^2$] | Std Dev | AC Impedance Electrode [Ω cm$^2$] | Std Dev | AC Impedance Total [Ω cm$^2$] | Std Dev |
|---|---|---|---|---|---|---|---|---|---|
| A | 0.35 | 0.3 | N | 0.160 | 0.012 | 0.403 | 0.130 | 0.563 | 0.141 |
| B | 0.65 | 0.3 | N | 0.283 | 0.023 | 0.514 | 0.109 | 0.797 | 0.088 |
| C | 0.35 | 0.7 | N | 0.129 | 0.004 | 0.118 | 0.034 | 0.248 | 0.037 |
| D | 0.65 | 0.7 | N | 0.275 | 0.154 | 0.188 | 0.001 | 0.463 | 0.155 |
| F | 0.50 | 0.5 | N | 0.233 | 0.018 | 0.495 | 0.250 | 0.728 | 0.267 |
| H | 0.50 | 0.5 | N | 0.167 | 0.008 | 0.088 | 0.008 | 0.255 | 0.005 |
| AI | 0.35 | 0.3 | Y | 0.146 | 0.005 | 0.073 | 0.013 | 0.219 | 0.016 |
| BI | 0.65 | 0.3 | Y | 0.211 | 0.003 | 0.108 | 0.018 | 0.319 | 0.018 |

TABLE 3-continued

Results of ASR Measurements for Example 1

| Run ID | Volume Fraction Electrolyte | x, in $La_{1-x}Sr_xCo_{0.2}Fe_{0.8}O_3$ | Infiltrated | AC Impedance Ohmic [$\Omega$ cm$^2$] | Std Dev | AC Impedance Electrode [$\Omega$ cm$^2$] | Std Dev | AC Impedance Total [$\Omega$ cm$^2$] | Std Dev |
|---|---|---|---|---|---|---|---|---|---|
| CI | 0.35 | 0.7 | Y | 0.135 | 0.003 | 0.075 | 0.020 | 0.210 | 0.019 |
| DI | 0.65 | 0.7 | Y | 0.183 | 0.006 | 0.184 | 0.033 | 0.367 | 0.035 |
| FI | 0.50 | 0.5 | Y | 0.185 | 0.009 | 0.124 | 0.020 | 0.309 | 0.028 |
| HI | 0.50 | 0.5 | Y | 0.146 | 0.013 | 0.075 | 0.013 | 0.221 | 0.025 |

Results are the average of measurements on three coupons of each run ID. Run H is a repeat of F, except the electrode tape slip was processed using a longer paint shake time which resulted in a more homogenous micro-structure and lower ASR.
All impedance values were measured at 750° C..
The "I" in Run ID denotes infiltrated coupons.

Figure 4:
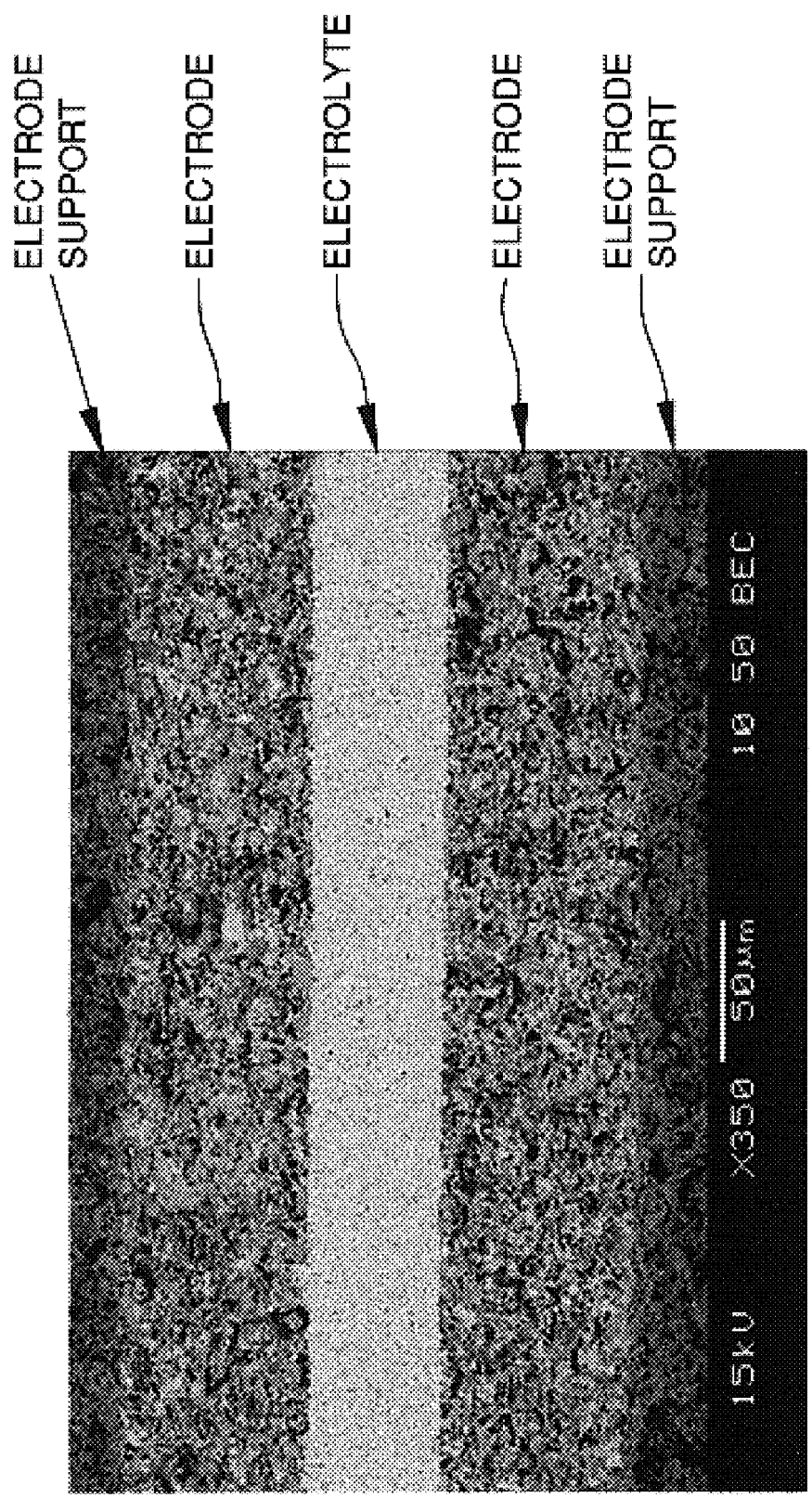
FIG. 4 is a photomicrograph of a section of the exemplary electrochemical cell of FIG. 1.

Scanning Electron Microscope (SEM) images of fracture cross-sections were made and a representative image is shown in FIG. 4, which reveals a high level of porosity in the electrolyte. Cell performance is anticipated to increase as the porosity in the electrolyte decreases. Good bonding was observed between the different layers. Open porosities ranging from 40 to 60% were measured using the Archimedes principle on sintered control discs made from the electrode tapes. The sintered control discs were lightly crushed, and the surface areas of the crushed samples were measured by the BET nitrogen adsorption method. The surface areas for the crushed electrode material ranged between 0.3 to 0.4 m$^2$/g.

Laminates of type C and H (Tables 2 and 3) were sintered at 1250° C. and 1350° C. for 2 hours. The effect of co-sintering temperature on resistance was measured on these coupons and the results are summarized in Table 4. The data indicate that the porosity of the electrolyte decreased with increasing co-sintering temperature, which reduced the resistance of the electrolyte. The surface area of the electrode control discs decreased with increasing co-sintering temperature, which increased the electrode resistance.

Figure 5:
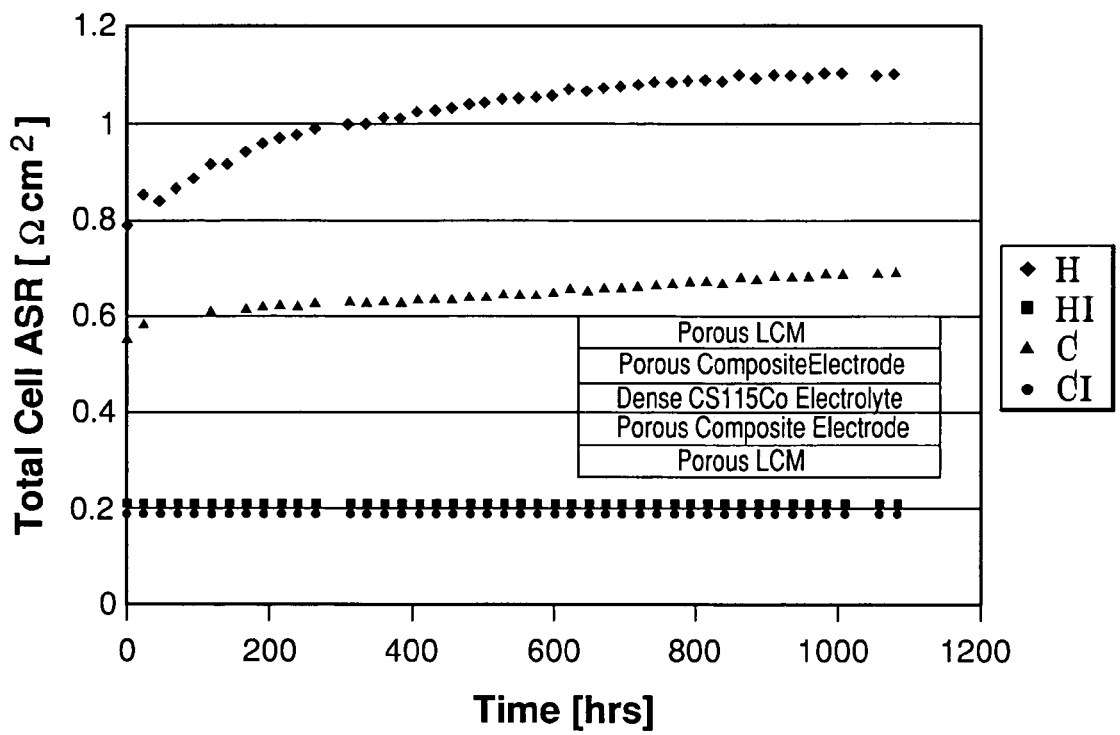
FIG. 5 is a plot of cell area specific resistance as a function of operating time for a co-sintered cell of Example 1.
Figure 7:
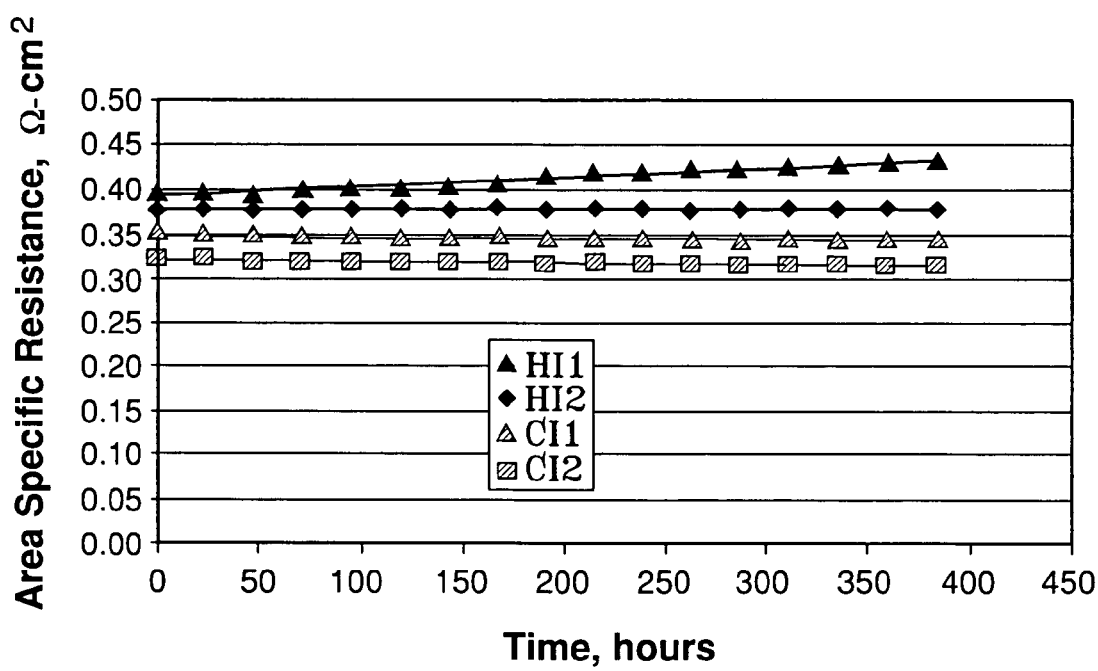
FIG. 7 is a plot of cell area specific resistance as a function of operating time for four different co-sintered cells of Example 2.

Three cells with the Fl electrode composition (Tables 2 and 3) showed stable performance at 750° C. with 800 mA current under DC bias for >6,500 hrs of operation, with total cell degradation rates of $\leq$0.5%/khrs or $\leq$2.2×10$^{-3}$ $\Omega$-cm$^2$/khrs. Additional cells of the C, Cl, H, and Hl type electrode composition (Tables 2 and 3) were tested in the same manner and the results are given in FIG. 5. The infiltrated samples showed stable performance at 3 Amps current under DC bias (400 mA/cm$^2$ current density) for >1000 hrs with no degradation, while the un-infiltrated samples show continuing degradation even after 1000 hrs of testing.

TABLE 4

| Description: Co-sintering Temperature and Electrode Type | Electrode ASR ($\Omega$ cm$^2$) | Std. Dev. | Total Cell ASR ($\Omega$ cm$^2$) | Std. Dev. | Electrolyte Resistivity ($\Omega$ cm) | Std. Dev. | # Cells Tested |
|---|---|---|---|---|---|---|---|
| 1250° C. Electrode C | 0.025 | 0.012 | 0.297 | 0.005 | 51.4 | 2.9 | 3 |
| 1250° C. Electrode H | 0.029 | 0.006 | 0.326 | 0.010 | 56.1 | 2.7 | 3 |
| 1300° C. Electrode C | 0.057 | 0.007 | 0.209 | 0.001 | 28.8 | 1.3 | 3 |
| 1300° C. Electrode H | 0.063 | 0.005 | 0.233 | 0.001 | 31.9 | 0.8 | 4 |
| 1350° C. Electrode C | 0.078 | 0.004 | 0.194 | 0.004 | 21.9 | 0.5 | 3 |
| 1350° C. Electrode H | 0.064 | 0.005 | 0.190 | 0.003 | 23.8 | 0.4 | 3 |

AC Impedance Measured at 750° C.

EXAMPLE 2

Co-Sintered Electrochemical Cell Incorporating Slots in Interconnect

LCM electrode support tapes (formulated to be porous after sintering), electrode tapes (formulated to be porous after sintering), and electrolyte tapes (formulated to be dense after sintering) described in Example 1 were used to fabricate green multi-layer cells that were then co-sintered. A green electrode tape was prepared from pre-reacted LCM powder that had been milled to a surface area of ~4.5 m$^2$/g. The tape was made as follows: 1000 g of LCM powder, 364.8 g of toluene, 91.20 g ethanol, 5 grams PVB B-79, and 1000 g 15 mm Ø YTZ media were added to a 1 liter HDPE bottle. The bottle was paint shaken for ½ hr after which 85.69 g PVB B-98 and 45.34 g BBP S160 were added followed by 1 hr of paint shaking. The bottle was then placed on a ball mill and allowed to roll at ~50 RPM for ~12 hrs. The slip was cast on a Mylar carrier film using a doctor blade to make a green ceramic tape.

Discs (~4.35 cm diameter) were punched with metal tooling out of the green electrolyte tape and smaller discs (~3.87 cm diameter), referred to here as cores, were punched out of the LCM electrode support and electrode tapes. Annulus-shaped rims were punched out of the LCM tape to form rims with an O.D. of ~4.35 cm and an I.D. of ~3.87 cm. The LCM rims, the LCM electrode support cores, and the electrode cores were laminated using heat and pressure to yield composite electrode layers, each comprising a bi-layer interior region of green electrode material and green electrode support material surrounded by the LCM rim. A rim-core structure was then heat laminated on each side of the electrolyte disc with the composite electrode side of the rim/core structure in contact with the electrolyte to form electrode support-electrode-lectrolyte-electrode-electrode support assemblies.

Figure 6A:
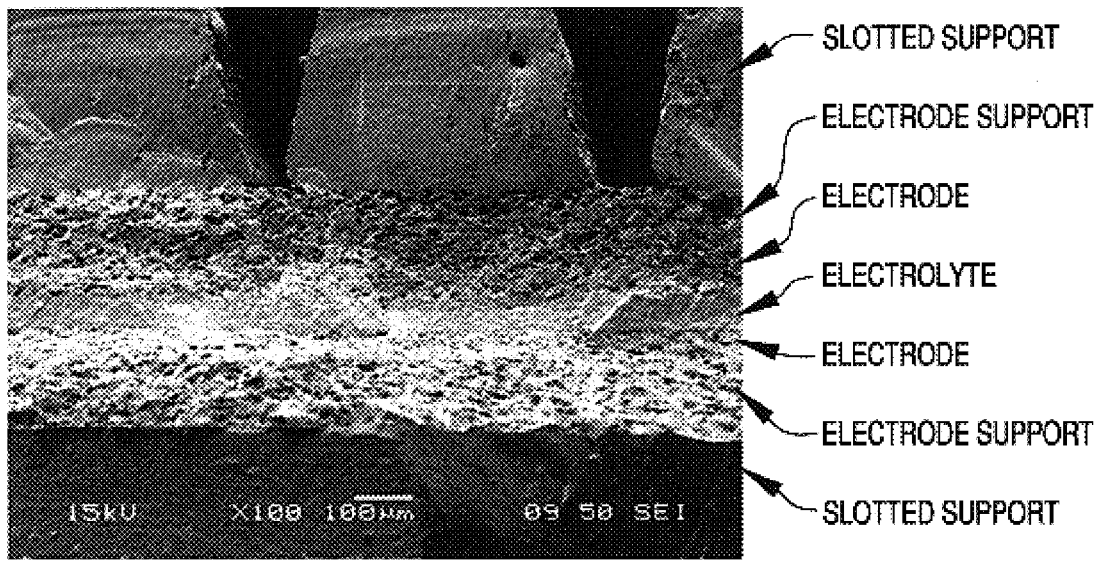
FIG. 6A is a secondary electron image of a section of the exemplary electrochemical cell of FIG. 1 including slotted interconnect layers.
Figure 6B:
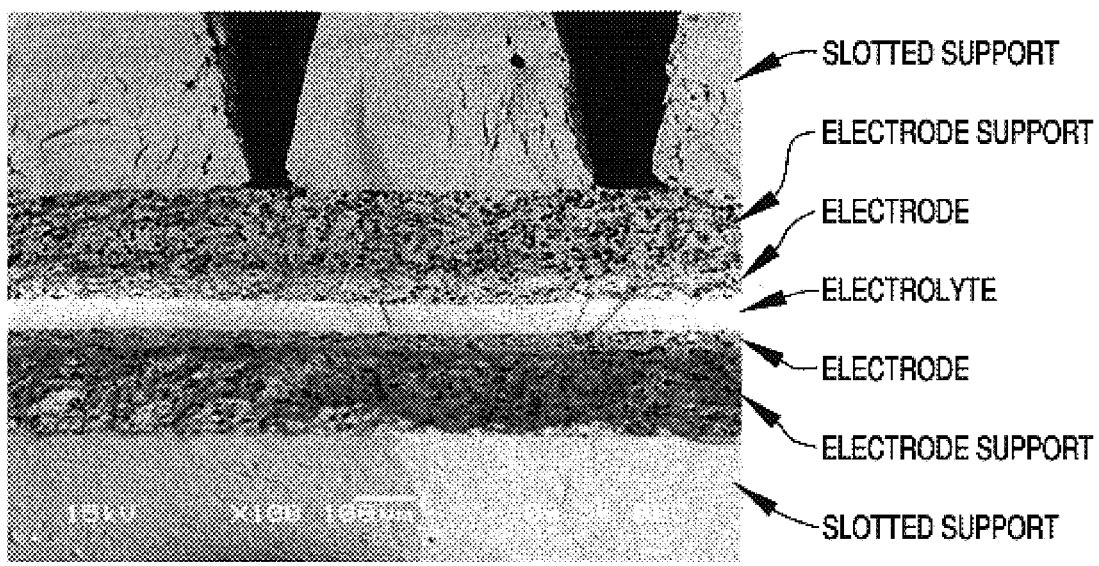
FIG. 6B is a backscattered electron image of a section of the exemplary electrochemical cell of FIG. 1 including slotted interconnect layers.

Discs of LCM tape were laser cut such that each had parallel slots in an interior region surrounded by an outer unslotted region or rim. These slots were similar to the slots shown in FIGS. 2A, 2B, 3A, and 3B. Double-slotted interconnect layers were made by laminating two slotted layers using α-terpineol solvent and pressure so that the slots of the two layers were oriented orthogonally to each other. A double-slotted interconnect layer was then laminated on each side of each electrode-electrolyte assembly to form green cell structures, each of which comprised an electrolyte layer, composite electrode layers on either side of the electrolyte layer, electrode support layers on the outer sides of the composite electrode layers, and double-slotted interconnect layers on the outer sides of the composite electrode layers. Four of these green cell structures were made, two with type Hi electrodes and two with type Cl electrodes (Table 3), and the green cells were co-sintered according to the following furnace profile: 10° C./hr to 125° C.; hold at 125° C. for 2 hours; 2.5° C./hr to 250° C.; 10° C./hr to 350° C.; 50° C./hr to 1300° C.; hold at 1300° C. for 2 hours; and cool at ~50° C./hr to 25° C. FIG. 6A is a secondary electron image and FIG. 6B is a backscattered electron image of a section of a co-sintered cell made by this method.

The perimeter of each co-sintered disc was ground on a ~200 μm grit wheel in order to prevent the cell from short circuiting across the electrolyte layer. Total cell area specific resistance (ASR) was measured on each cell with a current density of 400 mA/cm² under DC bias at 750° C. The cells were tested with a current density of 400 mA/cm² under DC bias for over 350 hours and the results are shown in FIG. 8. Cells with LSCF5528:CS115 50:50 (type Hl) and LSCF3728:CS115 65:35 (type Cl) electrodes had initial total cell ASR's range from 0.32 to 0.40 Ω-cm² at 750° C. Three of the four showed essentially no degradation over the test period, but one cell (Hl1) showed significant degradation, possibly due to poor infiltration.

EXAMPLE 3

Co-Sintered Single Electrochemical Cell Producing High Purity Oxygen

A green cell was fabricated from green tape layers using the methods described in Examples 1 and 2. The oxygen ion-conducting electrolyte membrane was made from green $Ce_{0.845}Sm_{0.15}Co_{0.005}O_{1.925}$ tape. Green electrode bi-layers were made by laminating a green tape of 200 micron thick LCM electrode support material to a green tape of 90 micron thick electrode material. The electrode tape used corresponds to composition C in Table 2, in which the ceramic powder was 65 vol % LSCF3728 and the balance $Ce_{0.85}Sm_{0.15}O_{1.925}$. Electrode rims were made from LCM tape about 250 microns thick and were laminated to the green electrode bi-layers rims to form composite electrode layers, which were then laminated on each side of the electrolyte layer to form a green electrode-electrolyte structure.

A cathode side gas distribution interconnect layer was fabricated from two slotted sublayers shown in FIGS. 2A and 2B as described earlier with reference to the description of FIG. 1. Likewise, an anode-side gas collection interconnect layer was fabricated from two slotted sublayers shown in FIGS. 3A and 3B as described earlier with reference to the description of FIG. 1. The cathode side gas distribution interconnect layer and the anode-side gas collection interconnect layer were laminated on each side of the green electrode-electrolyte structure. Lastly, a cap made of LCM was laminated on the outer side of the cathode-side gas distribution interconnect layer and of the anode-side gas collection interconnect layer slotted layer. The assembly of the different layers in the laminated green cell is illustrated in the exploded view of FIG. 1.

The laminated green cell was placed on a bed of coarse LCM powder ~¼" thick and co-sintered. The furnace profile used was as follows: 20° C./hr to 120° C., 5° C./hr to 150° C., 0.5° C./hr to 200° C., 1° C./hr to 300° C., 2.5° C./hr to 400° C., 10° C./hr to 500° C., 25° C./hr to 1325° C., a hold at 1325° C. for 2 hours, and –50° C./hr to room temperature. Approximately 4.7 std liters per minute of air was forced through the furnace to aid in binder/organic removal. The cell was then creep flattened between dense MgO plates with an 11.5 kg load placed on top of it. The creep flattening thermal profile used was as follows: 50° C./hr to 1225° C., hold at 1225° C. for 3 hours, and cool at –50° C./hr to room temperature. The structure of the co-sintered cell layers is summarized in Table 5.

TABLE 5

Description of Layers in the Cell of Example 3

| Layer ID (See FIGS. 1, 2A, 2B, 3A, 3B) | Composition/Description |
| --- | --- |
| 15 | Dense LCM cap layer |
| FIG. 2B | Dense LCM feed side cathode interconnect sublayer with slots |
| FIG. 2A | Dense LCM feed side cathode interconnect sublayer with slots orthogonal to the slots of FIG. 2B |
| 7 | Bilayer porous cathode support and porous cathode (interior region 27, FIG. 1) surrounded by dense LCM rim (29, FIG. 1). Cathode side of bi-layer faces electrolyte layer. |
| 3 | Electrolyte $Ce_{0.845}Sm_{0.15}Co_{0.005}O_{1.925}$ |
| 5 | Bilayer porous anode support and porous anode (interior region 23, FIG. 1) surrounded by dense LCM rim (25, FIG. 1). Anode side of bi-layer faces electrolyte layer. |
| FIG. 3A | Dense LCM permeate side anode interconnect sublayer with slots |
| FIG. 3B | Dense LCM permeate side anode interconnect sublayer with slots orthogonal to the slots of FIG. 3A |
| 13 | Dense LCM terminal cap layer |

In Table 5, the sublayers of FIGS. 2A and 2B form layer 11 of FIG. 1 and the sublayers of FIGS. 3A and 3B form layer 9 of FIG. 1.

The co-fired cell was ground flat on both sides using an automatic polishing system (Buehler Economet 3 and Automet 2) and a 125 micron diamond grit metal bonded wheel. An LCM tube and stainless steel pipe with a cup welded to one end were glassed using a glass ink to the anode port (21, FIG. 1) for oxygen collection and on one of the cathode ports (19, FIG. 1) to supply air to the cathode side of the electrochemical cell. In addition, flat pieces of LCM also were glassed on the bottom side of the cell (opposite the tube and piping) to form a terminal end cap in order to seal the port holes, which is needed to force air across the cathode side gas distribution interconnect layer and to seal the bottom of the oxygen permeate manifold formed within the stack by holes 21 in each layer of the stack (see FIG. 1).

A catalyst solution consisting of hydrated metal nitrates to make a composition of $La_{0.3}Sr_{0.7}Co_{1.01}O_{3-\delta}$ was vacuum infiltrated into the cell. A slow thermal profile was used to decompose and outgas the nitrate in the solution, leaving behind the metals. The slow heating cycle was used to prevent damage to the couple as the nitrate decomposed. The profile used was as follows: 50° C./hr to 100° C., 5° C./hr to 205° C., 4 hour hold at 205° C., 20° C./hr to 280° C., 5° C./hr to 320° C., 4 hour hold at 320° C., 20° C./hr to 540° C., 5° C./hr to 595° C., 4 hour hold at 595° C., 5° C./hr to 650° C., 20° C./hr to 750°, a hold at 750° C. for 10 hours, and –50° C./hr to room temperature.

The cell was leak checked using a vacuum decay method prior to electrochemical testing. A leak rate of ~0.65 sccm was measured on the couple. Longer stainless steel pipes were welded onto the short ones in order to connect to an air feed line for the cathode and an oxygen sensor and flow-meter for the anode. Silver lead wires were attached to each side of the cell in order to supply the electrical current needed to pump the oxygen and to be used as sense leads for electrochemical testing. An active cross-sectional flow area of ~49 $cm^2$ (i.e., the cross-sectional area of the electrode that was active in directing gas to the electrolyte) was tested and the electrolyte was ~55 microns thick. 100% $O_2$ purity was measured on the cell permeate using a Servomex brand oxygen sensor. This cell was operated at up to 17.1 amps DC and the ASR at 17.1 amps DC was 1.04 $\Omega\text{-}cm^2$. Flow efficiency, defined as the measured oxygen flow as a percent of the theoretical oxygen flow based on the electrical current supplied, was ~75% at all operating currents. The low flow efficiency was likely due to electronic conductivity in the electrolyte or in the rim region of the electrolyte, and suggests a transference number (fraction of the total conductivity that is ionic) of ~0.75 for this cell.

EXAMPLE 4

Stack of Three Co-Sintered Electrochemical Cells

Three cells were assembled and processed as described in Example 3 except that a different thermal cycle was used for sintering. The thermal cycle used was as follows: 20° C./hr to 100° C., 1° C./hr to 300° C., 2° C./hr to 400° C., 50° C./hr to 1000° C., 25° C./hr to 1325°, a hold at 1325° C. for 2 hours, and ~50° C./hr to room temperature. Approximately 2.8 std liters per minute of air was forced through the furnace to aid in binder removal. These cells were ground by hand using a 125 micron diamond grit metal bonded wheel. The three co-sintered cells were glassed together to form a three-cell stack. As much metal nitrate catalyst solution as possible was vacuumed out of the stack to prevent damage in a fast thermal profile that used 50° C./hr ramp rates and a hold at 750° C. Otherwise, the processing was the same as described in Example 3. A bead of glass ink was applied around the port holes to seal the couples together and a bead of silver ink was applied in the non-sealing regions to provide electrical interconnection between the three couples.

This three cell stack had a high leak rate. The couples were not perfectly flat, so a good seal was not made, and leaks through the electrolyte membranes of the cells were present. The anode seal was intact enough to permit the collection of oxygen permeate and measure the flow rate in the anode-side permeate pipe. The electrolyte was ~55 microns thick, the stack was operated at ~20 amps DC, and an active cross-sectional flow area of ~49 $cm^2$ (i.e., the cross-sectional area of the electrode that was active in directing gas to the electrolyte) was tested. About 45 sccm of feed air leaked into the oxygen side during operation. A total flow of 262 sccm was measured out of the oxygen pipe and the purity was measured at 87% with a Servomex analyzer. This suggests 223 sccm of $O_2$, which is the expected flow at 20.2 amps DC. DC ASR at 20.2 amps was ~0.4 $\Omega\text{-}cm^2$. The stack was operated for over 200 hours without significant degradation in performance.

The invention claimed is:

1. A method of making an electrochemical device for the recovery of oxygen from an oxygen-containing feed gas comprising
   (a) preparing a green electrochemical device by assembling a green electrolyte layer, a green anode layer in contact with the green electrolyte layer, a green cathode layer in contact with the green electrolyte layer, a green anode-side gas collection interconnect layer in contact with the green anode layer, and a green cathode-side gas distribution interconnect layer in contact with the green cathode layer, wherein either or both of the green anode layer and the green cathode layer comprises a layer of green electrode material in contact with a layer of green electrode support material; and
   (b) sintering the green electrochemical device by heating to yield a sintered electrochemical device comprising a plurality of sintered layers including a sintered anode-side gas collection interconnect layer in contact with the anode layer and adapted to collect oxygen permeate gas, wherein each sintered layer is bonded to an adjacent sintered layer during sintering.

2. The method of claim 1 wherein the sintered electrochemical device comprises a dense sintered electrolyte layer, a porous sintered cathode layer, and a porous sintered anode layer.

3. The method of claim 2 wherein the sintered anode-side gas collection interconnect layer comprises dense material and includes gas collection channels.

4. The method of claim 2 wherein at least a portion of the green electrolyte layer is prepared from an electrolyte precursor powder comprising an oxide of cerium and an oxide or oxides of one or more elements selected from the group consisting of cobalt, yttrium, gadolinium, and samarium.

5. The method of claim 4 wherein the surface area of the electrolyte precursor powder is between about 3 $m^2/g$ and about 20 $m^2/g$.

6. The method of claim 4 wherein the green electrolyte layer comprises a peripheral region or rim prepared from an electrolyte precursor powder consisting essentially of oxides of cerium and cobalt and the dense sintered electrolyte layer comprises a dense peripheral region or rim consisting essentially of oxides of cerium and cobalt.

7. The method of claim 1 wherein the green electrode material is prepared from (1) a first electrode precursor powder comprising an oxide of cerium and an oxide or oxides of one or more elements selected from the group consisting of cobalt, yttrium, gadolinium, and samarium and (2) a second electrode precursor powder comprising oxides of lanthanum, strontium, cobalt, and iron.

8. The method of claim 7 wherein at least a portion of the layer of green electrode material is prepared from a slip comprising the first electrode precursor powder, the second electrode precursor powder, and a pore former.

9. The method of claim 1 wherein at least a portion of the layer of green electrode support material is prepared from an electrode support precursor powder comprising oxides of lanthanum, calcium, and manganese.

10. The method of claim 9 wherein at least a portion of the layer of green electrode support material is prepared from a slip comprising the electrode support precursor powder and a pore former.

11. The method of claim 1 wherein any of the layers are formed by tape casting.

12. The method of claim 1 wherein
   (1) the green electrolyte layer is in contact with the layer of green electrode material;
   (2) the green electrolyte layer is prepared from an electrolyte precursor powder comprising oxides of cerium and cobalt and an oxide or oxides of one or more elements selected from the group consisting of yttrium, gadolinium, and samarium;
   (3) the layer of green electrode material is prepared from an electrode precursor powder comprising an oxide of cerium and an oxide or oxides of one or more elements selected from the group consisting of cobalt, yttrium, gadolinium, and samarium; and
   (4) the surface area of the electrolyte precursor powder is greater than the surface area of the electrode precursor powder.

13. The method of claim 12 wherein the surface area of the electrolyte precursor powder is between about 3 $m^2/g$ and about 20 $m^2/g$ and the surface area of the electrode precursor powder is between about 0.25 $m^2/g$ and about 10 $m^2/g$.

14. The method of claim 1 wherein either or both of the green anode-side gas collection interconnect layer and the green cathode-side gas distribution interconnect layer are prepared from material that (1) includes an interconnect precursor powder comprising calcium carbonate and oxides of lanthanum and manganese and (2) excludes pore formers.

15. The method of claim 14 which further comprises forming gas channels in the green anode-side gas collection interconnect layer and the green cathode-side gas distribution interconnect layer.

16. The method of claim 1 wherein the green electrochemical device is assembled by
   (1) forming a green electrode-electrolyte layer assembly by placing the green anode layer against one surface of the green electrolyte layer, placing the green cathode layer against the other surface of the green electrolyte layer, applying a pressure in the range of 5 to 100 MPa to the layer assembly in a direction normal to the layer assembly while maintaining the temperature of the layer assembly in the range of 50 to 100° C., thereby forming a laminated electrode-electrolyte assembly; and
   (2) forming a green electrolyte-electrode-interconnect assembly by coating the green anode-side gas collection interconnect layer and the green cathode-side gas distribution interconnect layer with a solvent, placing the green anode-side gas collection interconnect layer against one surface of the laminated electrode-electrolyte assembly, placing the green cathode side gas distribution interconnect layer against the other surface of the laminated electrode-electrolyte assembly, and applying a pressure in the range of 0.1 to 50 MPa to the green electrolyte-electrode-interconnect assembly in a direction normal to the assembly.

17. The method of claim 1 wherein the sintered electrochemical device includes a porous sintered anode layer and a porous sintered cathode layer and wherein the method further comprises the additional steps of forming a liquid precursor containing a powdered electrocatalyst, introducing the liquid precursor into the pores of the sintered anode and cathode layers, and heating the sintered electrochemical device to a temperature in the range of about 500° C. to about 900° C.

18. The method of claim 17 wherein the electrocatalyst is selected from the group consisting of a noble metal and one or more transition metal oxides.

19. The method of claim 18 wherein the electrocatalyst comprises a material having the composition $(La_{1-y}Sr_y)_A(Co_{1-z}Fe_z)_B O_{3-\delta}$, where the ratio A/B on a molar basis is between 0.95 and 1.05, $0.2<y<0.8$, $0\leq z\leq 1$, and $\delta$ is dependent on the valence and amount of the cations in order to satisfy electroneutrality.

20. The method of claim 18 wherein the electrocatalyst comprises a material having the composition $(La_{1-y}Sr_y)_A(Co)_B O_{3-\delta}$, where the ratio A/B on a molar basis is between 1.00 and 1.02, $0.4\leq y\leq 0.7$, and $\delta$ is dependent on the valence and amount of the cations in order to satisfy electroneutrality.

21. A method of making an electrochemical device for the recovery of oxygen from an oxygen-containing feed gas comprising
   (a) preparing a green electrochemical device by assembling a green electrolyte layer, a green anode layer in contact with the green electrolyte layer, a green cathode layer in contact with the green electrolyte layer, a green anode-side gas collection interconnect layer in contact with the green anode layer, and a green cathode-side gas distribution interconnect layer in contact with the green cathode layer, wherein the green anode layer comprises (1) a central region prepared from one or more metal oxide precursor powders and a pore former and (2) a peripheral region prepared from material that includes a metal oxide precursor powder and excludes pore formers; and
   (b) sintering the green electrochemical device by heating to yield a sintered electrochemical device comprising a plurality of sintered layers including a sintered anode-side gas collection interconnect layer in contact with the anode layer and adapted to collect oxygen permeate gas, wherein each sintered layer is bonded to an adjacent sintered layer during sintering.

22. The method of claim 21 wherein the green cathode layer comprises (1) a central region prepared from one or more metal oxide precursor powders and a pore former and (2) a peripheral region prepared from material that includes a metal oxide precursor powder and excludes pore formers.

23. A method of making an electrochemical stack for the recovery of oxygen from an oxygen-containing feed gas comprising
   (a) preparing a plurality of green electrochemical cells, wherein each cell is made by assembling a green electrolyte layer, a green anode layer in contact with the green electrolyte layer, a green cathode layer in contact with the green electrolyte layer, a green anode-side gas collection interconnect layer in contact with the green anode layer, a green cathode-side gas distribution interconnect layer in contact with the green cathode layer, and a green end cap in contact with either the green anode-side gas collection interconnect layer or the green cathode-side gas distribution interconnect layer wherein either or both of the green anode layer and the green cathode layer comprises a layer of green electrode material in contact with a layer of green electrode support material;

(b) assembling a stack of the green electrochemical cells to form a green stack having a top end and a bottom end, and adding a green terminal end cap at either the top end or the bottom end of the stack; and (c) co-sintering the stack by heating to yield the electrochemical stack comprising a plurality of sintered electrochemical cells, wherein each cell includes a sintered anode-side gas collection interconnect layer in contact with the anode layer and adapted to collect oxygen permeate gas, and wherein each sintered layer is bonded to an adjacent sintered layer during sintering.

24. The method of claim 23 wherein each sintered electrochemical cell comprises a plurality of sintered layers including a dense electrolyte layer, a porous anode layer bonded to one side of the dense electrolyte layer, a porous cathode layer bonded to the other side of the dense electrolyte layer, a dense anode-side interconnect layer in contact with the porous anode layer and having channels therein adapted for gas flow, and a dense cathode-side gas distribution interconnect layer in contact with the porous cathode layer and having channels therein adapted to distribute a feed gas to the cathode layer, wherein the coefficient of thermal expansion of the dense electrolyte layer is less than the coefficient of thermal expansion of the dense anode-side gas collection interconnect layer and the coefficient of thermal expansion of the dense cathode-side gas distribution interconnect layer.

25. The method of claim 24 wherein the dense electrolyte layer of any sintered electrochemical cell is in compression when the electrochemical stack is at temperatures in the range of about 500° C. to about 900° C.

* * * * *